(12) United States Patent
Howald et al.

(10) Patent No.: US 11,410,175 B2
(45) Date of Patent: Aug. 9, 2022

(54) SYSTEM AND METHOD FOR AUTHENTICATION WITH OUT-OF-BAND USER INTERACTION

(71) Applicant: Walrus Security, Inc., New York, NY (US)

(72) Inventors: Max Ira Howald, New York, NY (US); Riad Samir Wahby, Menlo Park, CA (US); Michael Walfish, New York, NY (US); Andrew Justin Blumberg, New York, NY (US)

(73) Assignee: WALRUS SECURITY, INC., New York, NY (US)

(*) Notice: Subject to any disclaimer, the term of this patent is extended or adjusted under 35 U.S.C. 154(b) by 1001 days.

(21) Appl. No.: 16/130,832

(22) Filed: Sep. 13, 2018

(65) Prior Publication Data

US 2019/0080331 A1    Mar. 14, 2019

Related U.S. Application Data

(60) Provisional application No. 62/558,243, filed on Sep. 13, 2017.

(51) Int. Cl.
*G06Q 20/40* (2012.01)
*G10L 15/02* (2006.01)
(Continued)

(52) U.S. Cl.
CPC ....... *G06Q 20/40145* (2013.01); *G06F 21/32* (2013.01); *G06Q 20/388* (2013.01);
(Continued)

(58) Field of Classification Search
CPC .............. G06Q 20/40145; G06Q 20/388; G06F 21/32; G10L 15/02; H04L 9/006;
(Continued)

(56) References Cited

U.S. PATENT DOCUMENTS

| | | | | | |
|---|---|---|---|---|---|
| 5,475,756 | A | * | 12/1995 | Merritt ................. | G06Q 20/382 705/72 |
| 10,853,816 | B1 | * | 12/2020 | Gaeta ................ | G06Q 20/40145 |
| 2009/0138405 | A1 | * | 5/2009 | Blessing ................ | G06Q 20/32 705/67 |

FOREIGN PATENT DOCUMENTS

KR    20160113383 A  *  9/2016    .......... G06K 9/00483

\* cited by examiner

*Primary Examiner* — John W Hayes
*Assistant Examiner* — Taylor S Rak
(74) *Attorney, Agent, or Firm* — Baker Botts L.L.P.

(57) ABSTRACT

Systems and methods for authenticating a party to a secure transaction may include receiving, from a first computing device on behalf of a first party at a second computing device of a second party, information associated with a secure transaction between the parties, receiving, from the first device at the second device, video or audio evidence of actions taken by the first party, capturing, by the second computing device during presentation of the video or audio evidence, acknowledgement of actions taken by the first party as observed or heard by the second party in the evidence, determining, dependent on the acknowledgement, whether the actions observed or heard by the second party match expected actions of the first party in accordance with an out-of-band user interaction protocol, and determining whether to accept the information associated with the secure transaction dependent on whether the observed or heard actions match the expected actions.

16 Claims, 14 Drawing Sheets

(51) Int. Cl.
*H04L 9/00* (2022.01)
*G06Q 20/38* (2012.01)
*H04W 12/00* (2021.01)
*H04L 9/32* (2006.01)
*H04L 9/08* (2006.01)
*H04L 9/40* (2022.01)
*G06F 21/32* (2013.01)

(52) U.S. Cl.
CPC .............. *G10L 15/02* (2013.01); *H04L 9/006* (2013.01); *H04L 9/0844* (2013.01); *H04L 9/3213* (2013.01); *H04L 9/3215* (2013.01); *H04L 9/3228* (2013.01); *H04L 9/3231* (2013.01); *H04L 9/3239* (2013.01); *H04L 9/3247* (2013.01); *H04L 9/3271* (2013.01); *H04L 63/0442* (2013.01); *H04L 63/0861* (2013.01); *H04L 63/18* (2013.01); *H04W 12/00* (2013.01); *H04L 2209/38* (2013.01); *H04L 2209/56* (2013.01)

(58) Field of Classification Search
CPC ... H04L 9/0844; H04L 9/3213; H04L 9/3215; H04L 9/3228; H04L 9/3231; H04L 9/3239; H04L 9/3247; H04L 9/3271; H04L 63/0442; H04L 63/0861; H04L 63/18; H04L 2209/38; H04L 2209/56; H04W 12/00
See application file for complete search history.

SYSTEM AND METHOD FOR AUTHENTICATION WITH OUT-OF-BAND USER INTERACTION

RELATED APPLICATIONS

This application claims priority to U.S. Provisional Application No. 62/558,243 filed Sep. 13, 2017, entitled "System and Method for Authentication with Out-Of-Band User Interaction," which is incorporated herein by reference in its entirety.

FIELD OF THE DISCLOSURE

This disclosure relates generally to establishing authenticated, encrypted communication channels between parties and, more particularly, to systems and methods for authenticating a party to a secure transaction using an out-of-band user interaction.

DESCRIPTION OF THE RELATED ART

Existing mechanisms for authenticating parties to secure transactions often involve cumbersome, heavyweight process. For example, banks have mechanisms for authenticating their own clients, such as requiring the clients to call and speak to a person, answer some secret questions (mother's maiden name, etc.), call from an approved phone and/or receive mail at an approved address. One major class of client authentications that occurs at banks involve mobile banking applications, which are typically authenticated via a phone number, an account number, and password. Wealthy people and corporations sometimes purchase expensive goods using a wire transfer of funds. There is a potential for fraud with these transactions in that a criminal can impersonate the recipient of the wire transfer and send false wiring instructions to the originator of funds. This is sometimes referred to as "payment instruction fraud." Existing bank verification procedures are susceptible to this type of attack.

Mechanisms through which parties exchange information, such as e-mail, text messaging, or even secure messaging systems may provide some amount of protection from malicious actors in that there might be some guarantees about whether an intermediary can eavesdrop on a given information exchange. However, there may be no guarantees about who a party with whom one is exchanging information actually is.

SUMMARY

In one aspect, a disclosed method is for authenticating a party to a secure transaction. The method includes receiving, from a first computing device on behalf of a first party at a second computing device of a second party, first information associated with a secure transaction between the first party and the second party, receiving, from the first computing device at the second computing device, first video or audio evidence of one or more actions taken by the first party, capturing, by the second computing device during presentation of the first video or audio evidence by the second computing device, acknowledgement of the one or more actions taken by the first party as observed or heard by the second party in the first video or audio evidence, determining, by the second computing device dependent on the captured acknowledgement, whether or not the one or more actions observed or heard by the second party match actions expected to have been taken by the first party in accordance with an out-of-band user interaction protocol, and determining, by the second computing device dependent on whether or not the one or more actions observed or heard by the second party match the actions expected to have been taken by the first party in accordance with the out-of-band user interaction protocol, whether to accept the first information associated with the secure transaction.

In any of the disclosed embodiments, the first information may be a public key of a public-private key pair created on behalf of the first party for potential use when exchanging information between the first party and the second party and the method may further include accepting, by the second computing device in response to determining that the one or more actions observed or heard by the second party match the actions expected to have been taken by the first party in accordance with the out-of-band user interaction protocol, the public key, receiving, from the first computing device, second information associated with the secure transaction, and using, by the second computing device, the public key to decrypt the second information.

In any of the disclosed embodiments, the first information may include an identifier of the first party and the method may further include authenticating, by the second computing device in response to determining that the one or more actions observed or heard by the second party match the actions expected to have been taken by the first party in accordance with the out-of-band user interaction protocol, the identifier of the first party, and subsequent to authenticating the identifier of the first party, allowing the secure transaction between the first party and the second party to proceed.

In any of the disclosed embodiments, the secure transaction may include a transfer of funds from the second party to the first party, and the first information may include payment instructions received from the first computing device on behalf of the first party.

In any of the disclosed embodiments, the first computing device may include a server of third party to the secure transaction, the first information may be received from the server on behalf of the first party, and the first video or audio evidence may be received from the server on behalf of the first party.

In any of the disclosed embodiments, the actions expected to have been taken by the first party in accordance with the out-of-band user interaction protocol may include communicating, in response to prompting by the first computing device, a sequence of tokens generated by the first computing device in accordance with the out-of-band user interaction protocol, and recording the communicating using a video camera or voice recorder. The first video or audio evidence may be based on the recording. Capturing acknowledgement of the one or more actions taken by the first party may include receiving, through a user interface of the second computing device, input identifying the sequence of tokens communicated by the first party as observed or heard by the second party in the first video or audio evidence.

In any of the disclosed embodiments, the method may further include, in response to determining that the one or more actions observed or heard by the second party match the actions expected to have been taken by the first party in accordance with the out-of-band user interaction protocol, recording, by the second computing device, second video or audio evidence of one or more actions taken by the second party in accordance with the out-of-band user interaction protocol, providing, to the first computing device, the second video or audio evidence of the one or more actions taken by the second party, and receiving, from the first computing device, an indication of whether or not actions observed or heard by the first party in the second video or audio evidence match actions expected to have been taken by the second party in accordance with the out-of-band user interaction protocol.

In any of the disclosed embodiments, the method may further include refraining from performing the secure transaction between the first party and the second party in response to determining that the one or more actions observed or heard by the second party do not match the actions expected to have been taken by the first party in accordance with the out-of-band user interaction protocol.

In any of the disclosed embodiments, the first video or audio evidence received from the first device may include a video stream transmitted to the second device during performance of the one or more actions by the first party, a video memo recorded during performance of the one or more actions by the first party, an audio stream transmitted to the second device during performance of the one or more actions by the first party, or an audio memo recorded during performance of the one or more actions by the first party.

In another aspect, a disclosed non-transitory computer readable memory media stores instructions executable for authenticating a party to a secure transaction. The instructions are executable by a processor for receiving, from a first computing device on behalf of a first party at a second computing device of a second party, first information associated with a secure transaction between the first party and the second party, receiving, from the first computing device at the second computing device, first video or audio evidence of one or more actions taken by the first party, capturing, by the second computing device during presentation of the first video or audio evidence by the second computing device, acknowledgement of the one or more actions taken by the first party as observed or heard by the second party in the first video or audio evidence, determining, by the second computing device dependent on the captured acknowledgement, whether or not the one or more actions observed or heard by the second party match actions expected to have been taken by the first party in accordance with an out-of-band user interaction protocol, allowing the secure transaction between the first party and the second party to proceed in response to determining that the one or more actions observed or heard by the second party match the actions expected to have been taken by the first party in accordance with the out-of-band user interaction protocol, and refraining from performing the secure transaction in response to determining that the one or more actions observed or heard by the second party do not match the actions expected to have been taken by the first party in accordance with the out-of-band user interaction protocol.

In any of the disclosed embodiments, the first information may be a public key of a public-private key pair created on behalf of the first party for potential use when exchanging information between the first party and the second party and the instructions may be further executable by the processor for accepting, by the second computing device in response to determining that the one or more actions observed or heard by the second party match the actions expected to have been taken by the first party in accordance with the out-of-band user interaction protocol, the public key, receiving, from the first computing device, second information associated with the secure transaction, and using, by the second computing device, the public key to decrypt the second information.

In any of the disclosed embodiments, the first information may include an identifier of the first party and the instructions may be further executable by the processor for authenticating, by the second computing device in response to determining that the one or more actions observed or heard by the second party match the actions expected to have been taken by the first party in accordance with the out-of-band user interaction protocol, the identifier of the first party, and subsequent to authenticating the identifier of the first party, allowing the secure transaction between the first party and the second party to proceed.

In any of the disclosed embodiments, the secure transaction may include a transfer of funds from the second party to the first party, and the first information may include payment instructions received from the first computing device on behalf of the first party.

In any of the disclosed embodiments, the actions expected to have been taken by the first party in accordance with the out-of-band user interaction protocol may include communicating, in response to prompting by the first computing device, a sequence of tokens generated by the first computing device in accordance with the out-of-band user interaction protocol, and recording the communicating using a video camera or voice recorder. The first video or audio evidence may be based on the recording. Capturing acknowledgement of the one or more actions taken by the first party may include receiving, through a user interface of the second computing device, input identifying the sequence of tokens communicated by the first party as observed or heard by the second party in the first video or audio evidence.

In any of the disclosed embodiments, the instructions may be further executable by the processor for, in response to determining that the one or more actions observed or heard by the second party match the actions expected to have been taken by the first party in accordance with the out-of-band user interaction protocol, recording, by the second computing device, second video or audio evidence of one or more actions taken by the second party in accordance with the out-of-band user interaction protocol, providing, to the first computing device, the second video or audio evidence of the one or more actions taken by the second party, and receiving, from the first computing device, an indication of whether or not actions observed or heard by the first party in the second video or audio evidence match actions expected to have been taken by the second party in accordance with the out-of-band user interaction protocol.

In any of the disclosed embodiments, the first video or audio evidence received from the first device may include a video stream transmitted to the second device during performance of the one or more actions by the first party, a video memo recorded during performance of the one or more actions by the first party, an audio stream transmitted to the second device during performance of the one or more actions by the first party, or an audio memo recorded during performance of the one or more actions by the first party.

In yet another aspect, a disclosed system for authenticating a party to a secure transaction includes a processor, and a memory storing instructions executable by the processor. The instructions are executable for receiving, from a first computing device on behalf of a first party, first information associated with a secure transaction between the first party and a second party, transmitting the first information to a second computing device of the second party, receiving, from the first computing device, first video or audio evidence of one or more actions taken by the first party, transmitting the first video or audio evidence to the second computing device, receiving, from the second computing device, an indication of whether or not actions observed or heard by the second party in the first video or audio evidence match actions expected to have been taken by the first party in accordance with an out-of-band user interaction protocol, and transmitting the indication of whether or not the actions observed or heard by the second party in the first video or audio evidence match the actions expected to have been taken by the first party in accordance with the out-of-band user interaction protocol to the first computing device.

In any of the disclosed embodiments, the first video or audio evidence received from the first device may include a video stream transmitted during performance of the one or more actions by the first party, a video memo recorded during performance of the one or more actions by the first party, an audio stream transmitted to the second device during performance of the one or more actions by the first party, or an audio memo recorded during performance of the one or more actions by the first party.

In any of the disclosed embodiments, the instructions may be further executable by the processor for receiving, from the first computing device, a sequence of tokens generated in accordance with the out-of-band user interaction protocol, receiving, from the second computing device, an acknowledgement of actions taken by the first party as observed or heard by the second party in the first video or audio evidence, and creating a transcript of the out-of-band user interaction protocol performed by the first party and the second party. The transcript may include the sequence of tokens received from the first computing device, the acknowledgment received from the second computing device, and the first video or audio evidence. The instructions may be further executable for storing the transcript in the memory.

In any of the disclosed embodiments, the instructions may be further executable by the processor for receiving, from the second computing device, second video or audio evidence of one or more actions taken by the second party in accordance with the out-of-band user interaction protocol, providing, to the first computing device, the second video or audio evidence of the one or more actions taken by the second party, receiving, from the first computing device, an indication of whether or not actions observed or heard by the first party in the second video or audio evidence match actions expected to have been taken by the second party in accordance with the out-of-band user interaction protocol, and transmitting the indication of whether or not the actions observed or heard by the first party in the second video or audio evidence match the actions expected to have been taken by the second party in accordance with the out-of-band user interaction protocol to the second computing device.

BRIEF DESCRIPTION OF THE DRAWINGS

For a more complete understanding of the present invention and its features and advantages, reference is now made to the following description, taken in conjunction with the accompanying drawings, in which.

DESCRIPTION OF PARTICULAR EMBODIMENT(S)

In the following description, details are set forth by way of example to facilitate discussion of the disclosed subject matter. It should be apparent to a person of ordinary skill in the field, however, that the disclosed embodiments are exemplary and not exhaustive of all possible embodiments.

Existing systems for implementing secure transactions, such as transactions involving an exchange of secure documents or other information, a transfer of funds, the registration, validation, or recovery of an account or password, or any of a variety of other types of secure transactions may include a wide range of security mechanisms designed to protect secure information. However, these systems may be vulnerable to attack by imposters, such as a malicious actor posing as a legitimate party to a secure transaction.

As will be described in further detail, the inventors of the present disclosure have developed methods and systems disclosed herein for establishing authenticated, encrypted channels between two parties to a secure transaction. The authentication may include the performance of an out-of-band user interaction in which the ability of humans to implicitly authenticate each other is leveraged to determine whether information exchanged between two parties is received from the correct party, rather than from an imposter. When the out-of-band user interaction between two parties completes successfully, each participant receives assurances that messages exchanged through the established channel were actually were sent by the other party.

In various embodiments, the systems and methods described herein may implement an out-of-band user interaction protocol that relies on video evidence that one or both parties to a secure transaction have performed particular actions in accordance with the out-of-band user interaction protocol and particular cryptographic methods. More specifically, the disclosed authentication mechanisms, which in some embodiments may be referred to as a human-in-the-loop key exchange (HiKE) protocol, may leverage the human ability to authenticate faces to provide a method for exchanging public keys (and other information, including message strings) with identity verification. The disclosed mechanisms may have the properties of authenticity (with assurances that a counterparty is the correct party), integrity (without the possibility of man-in-the-middle, or MITM, modifications), privacy (without the possibility of MITM viewing) and non-repudiability (avoiding the possibility that a party to a secure transaction will later disclaim their own participation).

Particular embodiments are best understood by reference to FIGS. 1, 2, 3, 4, 5A-5C, 6, 7A, 7B, 8, 9, 10, and 11.

Figure 1:
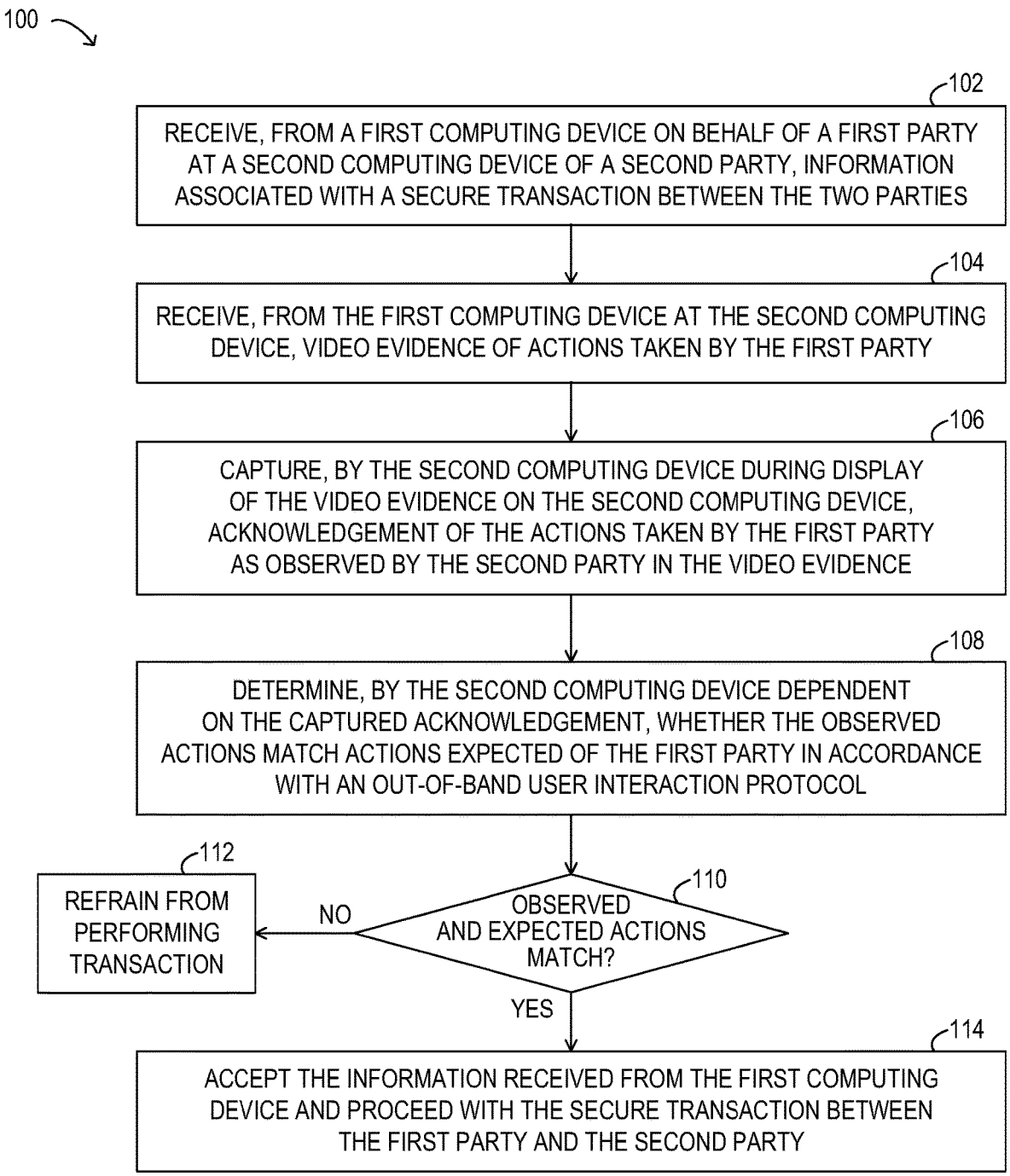
FIG. 1 is flow diagram illustrating selected elements of an embodiment of a method for authenticating a party to a secure transaction using an out-of-band user interaction.

Turning now to the drawings, FIG. 1 is flow diagram illustrating selected elements of an embodiment of a method 100 for authenticating a party to a secure transaction using an out-of-band user interaction. In various embodiments, operations of method 100 may be performed by one or more authentication agents executing on a computing device of a given one of two parties to a secure transaction. Method 100 may be performed once or repeatedly to authenticate parties, other than the given party, to respective transactions. It is noted that certain operations described in method 100 may be optional or may be rearranged in different embodiments.

As illustrated in FIG. 1, method 100 may include, at 102, receiving, from a first computing device on behalf of a first party at a second computing device of a second party, information associated with a secure transaction between the two parties. The secure transaction may involve an exchange of secure documents or other information, a transfer of funds, the registration, validation, or recovery of an account or password, or any of a variety of other types of secure transactions, in different embodiments.

At 104, method 100 may include receiving, from the first computing device at the second computing device, video evidence of actions taken by the first party to the secure transaction. The actions may have been performed by the first party in accordance with an out-of-band user interaction protocol through which the second party to the transaction can recognize the first party and authenticate the first party as the source of the information.

At 106, the method may include capturing, by the second computing device during the display of the video evidence on the second computing device, acknowledgement of the actions taken by the first party as observed by the second party in the video evidence. For example, the second computing device may capture the acknowledgement as input received from the second party through a user interface of the second computing device.

At 108, method 100 may include determining, by the second computing device dependent on the captured acknowledgement, whether the observed actions match the actions expected of the first party in accordance with the out-of-band user interaction protocol. If, at 110, it is determined that the observed and expected actions match, method 100 may continue at 114. Otherwise, the method may proceed to 112.

At 112, method 100 may include refraining from performing the secure transaction. For example, if the observed and expected actions do not match, the second user cannot be certain that the information associated with the transaction was, in fact, transmitted by the first party to the transaction and/or that the received information was not intercepted and modified by a malicious actor following its transmission by the first party. Therefore, the secure transaction may be aborted.

At 114, the method may include, in response to determining that the observed and expected actions match, accepting the information received from the first computing device and proceeding, at least temporarily, with the secure transaction between the first party and the second party. Note that the secure transaction may subsequently be aborted prior to its completion for any of a variety of reasons.

As will be described in more detail below, in at least some embodiments of the present disclosure, the out-of-band user interaction protocol may include two parties to a secure transaction performing a public key exchange and sharing a collection of tokens. During a video chat or an audio conference call, a first one of the parties may be prompted to communicate a sequence of tokens selected from the shared collection of tokens to the second party (e.g., by reading a series of words). The tokens in the sequence may be selected based on information generated by the process for exchanging the public keys. The second party may observe a video stream transmitted to the second party or listen to an audio stream transmitted to the second party as the first party communicates the sequence of tokens and may acknowledge each of the tokens in the sequence. If the tokens observed or heard by the second party match the tokens selected for the sequence of tokens, the protocol may complete successfully and the two parties may, thereafter, exchange information over an authenticated, encrypted channel using the exchanged public keys to decrypt messages received from each other. In other words, a face-to-face interaction or a conversation between the two parties may be used to bind their identities to their public keys and to information subsequently exchanged over the authenticated, encrypted channel.

Figure 2:
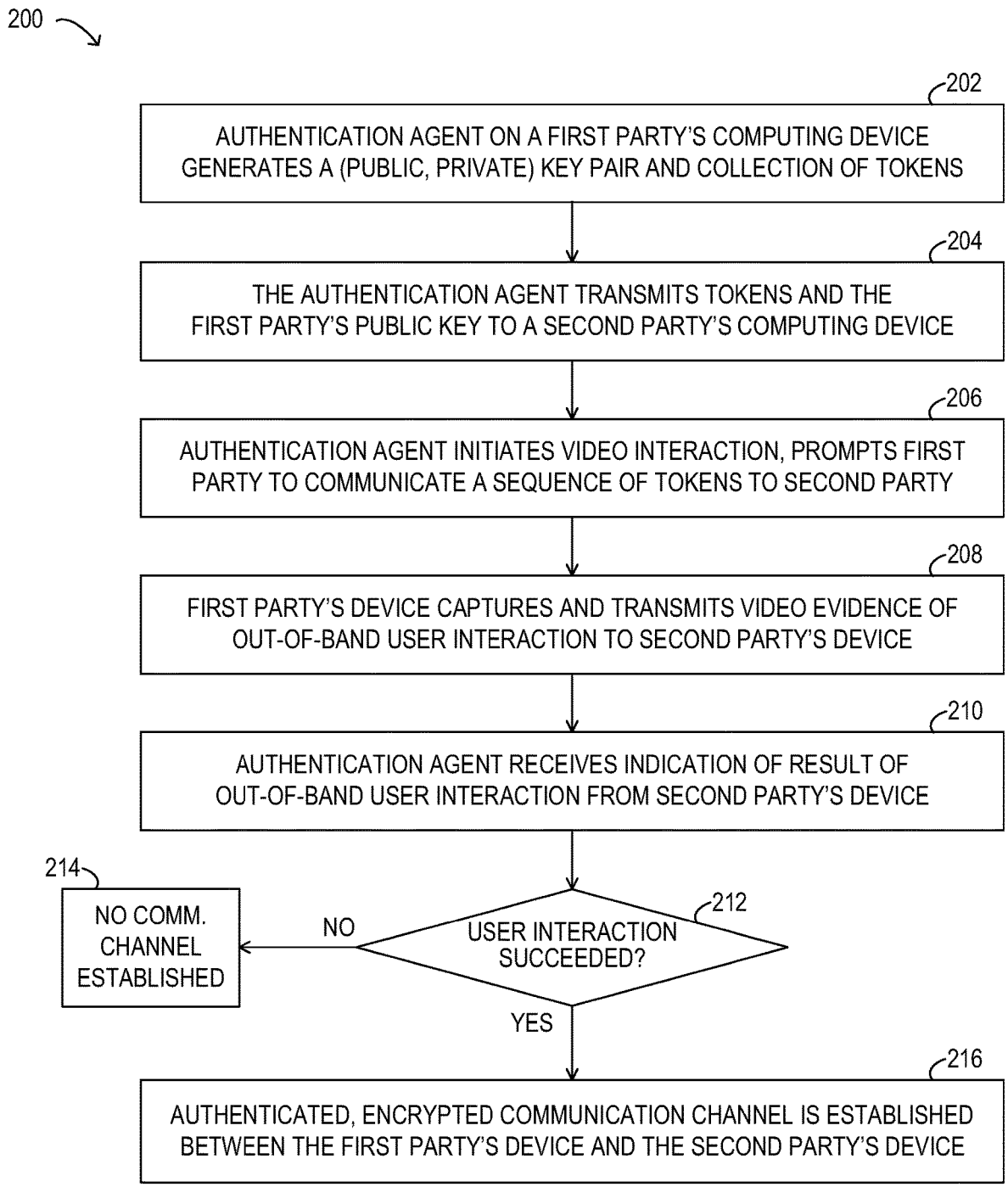
FIG. 2 is flow diagram illustrating selected elements of an embodiment of a method for establishing an authenticated, encrypted communication channel between two parties using an out-of-band user interaction.

FIG. 2 is flow diagram illustrating selected elements of an embodiment of a method 200 for establishing an authenticated, encrypted communication channel between two parties using an out-of-band user interaction. In various embodiments, operations of method 200 may be performed by one or more authentication agents executing on a computing device of a given one of two parties to a secure transaction. Method 200 may be performed once or repeatedly to establish respective communication channels between the given party and one or more other parties. It is noted that certain operations described in method 200 may be optional or may be rearranged in different embodiments.

As illustrated in FIG. 2, method 200 may include, at 202, an authentication agent executing on a computing device of the first party generating a (public, private) key pair and collection of tokens to be used for an out-of-band user interaction between the first party and a second party. In various embodiments, the (public, private) key pair may be generated using any suitable method including, but not limited to, those described herein. In various embodiments, the tokens may be implemented as numerical values, strings, words, images (e.g., pictures of different animals or common objects), or other human-recognizable elements. The tokens may also be referred herein to as "security words".

At 204, method 200 may include the authentication agent transmitting the tokens and the public key of the first party to a computing device of the second party. In various embodiments, the tokens and/or the public key may be transmitted directly from the computing device of the first party to the computing device of the second party or may be transmitted from the computing device of the first party to the computing device of the second party through a third-party computing device, such as a rendezvous device, a computing device of an authentication service, or a computing device of a third party to a transaction between the first and second parties.

At 206, the method may include the authentication agent initiating a video interaction between the first and second parties in accordance with an out-of-band user interaction protocol and prompting the first party to communicate a sequence of tokens from among the collection of tokens to the second party. For example, the authentication agent may initiate an interaction via an application executing on respective computing devices of the two parties (e.g., on their phones) or through browsers executing on respective desktop computers of the two parties. In some embodiments, the second party may initiate a video call to the first party, or vice versa, in response to a prompt from an instance of the authentication agent executing on their computing device. In some embodiments, the video call may be initiated using phone numbers or handles for one or more of the parties that are registered at a webserver of an authentication service on behalf of the parties. In various embodiments, communicating the sequence of tokens may include reading a sequence of numbers, strings, or words out loud while being recorded by a video camera, speaking the names of animals or objects depicted in a sequence of images while being recorded by a video camera, or pointing to or displaying a sequence of images depicting various types of tokens while being recorded by a video camera, for example.

At 208, method 200 may include the computing device of the first party capturing and transmitting video evidence of the out-of-band user interaction to the computing device of the second party. In some embodiments, capturing and transmitting the video evidence may include live streaming a video to the computing device of the second party during communication of the sequence of tokens. In other embodiments, capturing and transmitting the video evidence may include recording a video memo during communication of the sequence of tokens and subsequently transmitting the video memo to the computing device of the second party.

At 210, the method may include the authentication agent receiving an indication of a result of the out-of-band user interaction from the computing device of the second party. For example, while the second party watches the video evidence displayed on their computing device, the second party may be prompted to enter, through a user interface of an authentication agent executing on their computing device, information identifying the tokens communicated by the first party, as observed by the second party in the video evidence. Several non-limiting examples of such user interfaces are described below. In this example embodiment, if all tokens communicated by the first party, as observed by the second party, match the expected sequence of tokens, an indication of the success of the user interaction may be transmitted to the computing device of the first party by the computing device of the second party. If, however, not all tokens communicated by the first party, as observed by the second party, match the expected sequence of tokens, an indication of the failure of the user interaction may be transmitted to the computing device of the first party by the computing device of the second party. In some embodiments, the indication of success or failure received from the computing device of the second party may, once received, be displayed on the computing device of the first party.

If, at 212, if is determined that the user interaction succeeded, method 200 may continue at 216. Otherwise, the method may proceed to 214. At 214, the method may include refraining from establishing a secure communication channel for the use of the first and second parties. This may include the computing device of the second party rejecting or discarding the public key received from the computing device of the first party at 204.

At 216, in response to determining that the user interaction completed successfully, the first party and the second party may have successfully exchanged public keys, including the public key received from the computing device of the first party at 204, and an authenticated, encrypted communication channel may be established between the computing device of the first party and the computing device of the second party. Thereafter, the first and second parties may be able to communicate securely by sending messages to each other that are encrypted using the public keys. Since the private keys of the two parties are not known to others, each of the two parties may have assurances about the party with whom they are communicating over the communication channel.

Figure 5A:
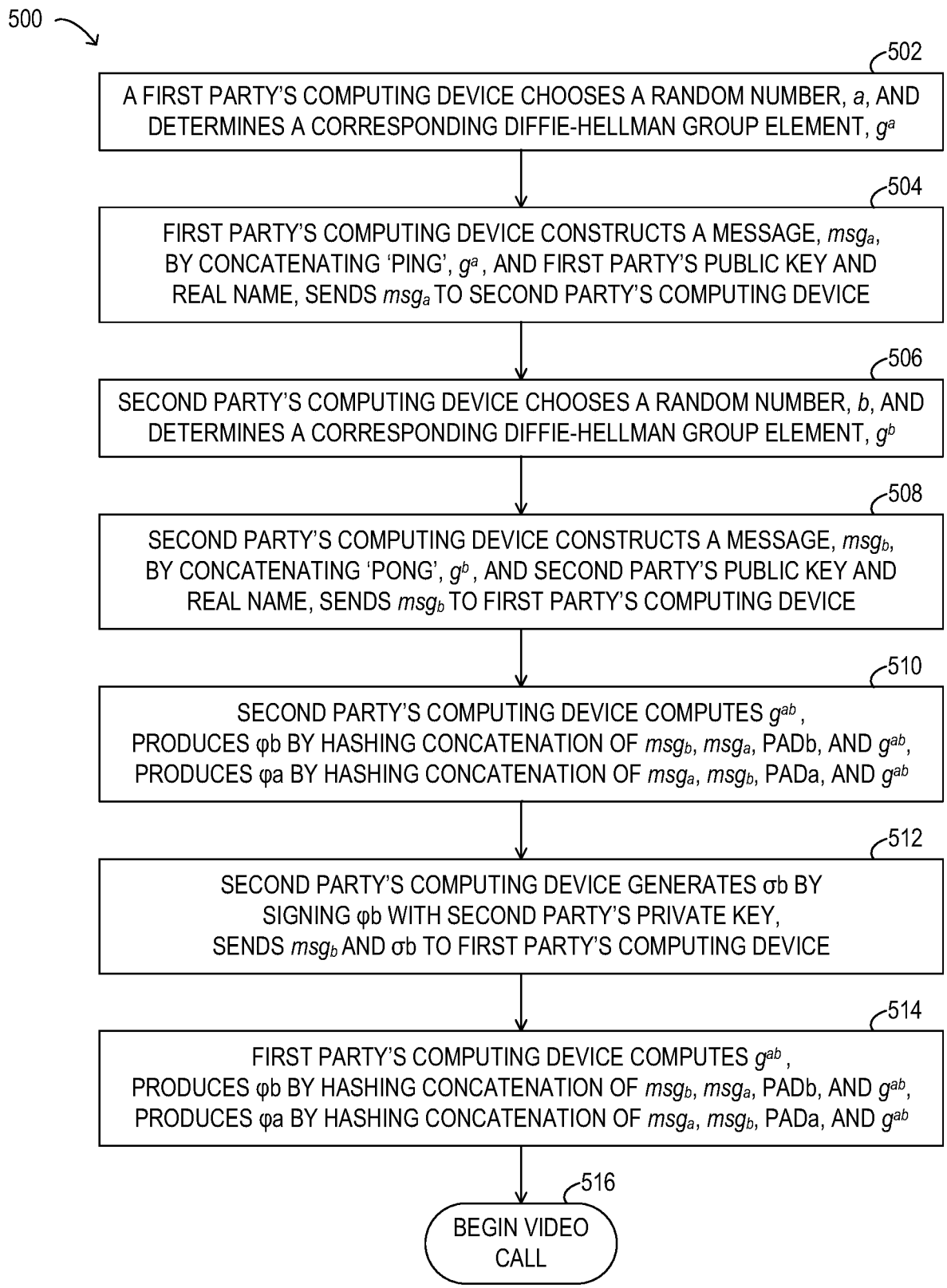
FIGS. 5A to 5C illustrate a flow diagram illustrating selected elements of an embodiment of a method for mutual authentication of two parties to a secure transaction in accordance with a two-way, interactive, out-of-band user interaction protocol.
Figure 5B:
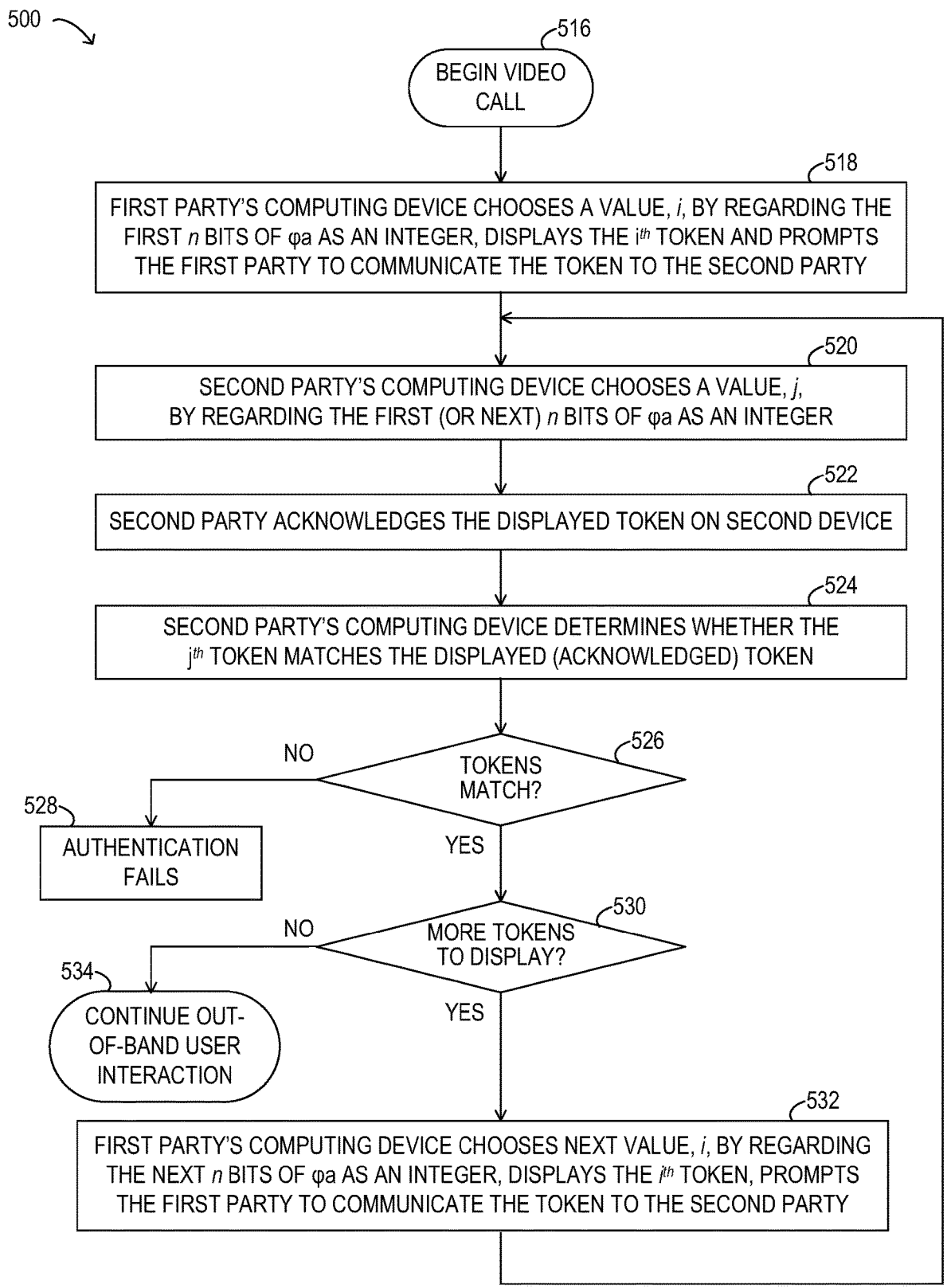
Figure 5C:
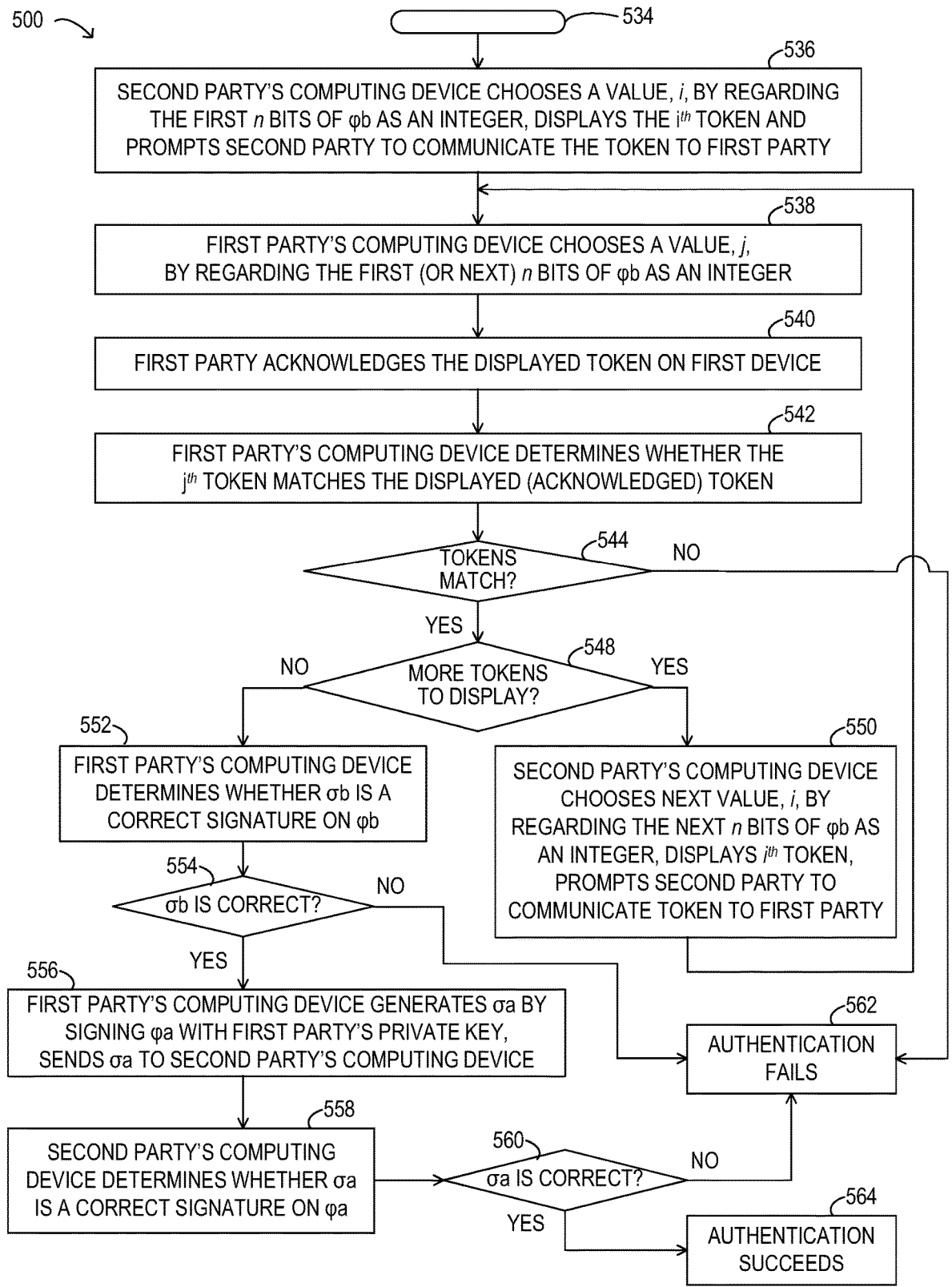

In embodiments of method 200 in which the out-of-band user interaction is a symmetric interaction, the method may include additional operations prior to 216. For example, if all tokens communicated by the first party, as observed by the second party, match the expected sequence of tokens, the out-of-band user interaction may repeat, with the roles of the first and second parties being reversed. An example embodiment that implements a two-way interactive protocol is illustrated in FIGS. 5A-5C and described in detail below.

In some embodiments of method 200, the out-of-band user interaction between the two parties might not be symmetric. For example, in some cases, only the first party needs to be authenticated to the second party. That is, the first party's messages and corresponding communication channel may be authenticated by the second party viewing the video evidence and successfully acknowledging the tokens that match the tokens that were expected to be communicated by the first party. In some embodiments, the second party might not need to be authenticated by the first party because the second party holds a certificate of trust or may have already been authenticated by a third party (e.g., a third party to a transaction between the first and second parties). In some embodiments, an asymmetric (i.e., one-way) out-of-band user interaction may include operations that are identical to those of symmetric (i.e., two-way) out-of-band user interaction, except that only one of the two parties to a secure transaction transmits or uploads video evidence and only the other party verifies the video evidence. As a result of the one-way out-of-band user interaction, the party that verifies the video evidence receives a public key from the party that uploads the video evidence and assurances about the identity of the party that uploads the video evidence.

In some embodiments of method 200 in which the two parties know each other well enough to recognize each other's voices, rather than performing the out-of-band user interaction during a live-streaming video chat or by recording (and subsequently playing back) a video memo, the out-of-band user interaction may be performed during a live-streaming audio call or by recording (and subsequently playing back) a voice memo.

Figure 6:
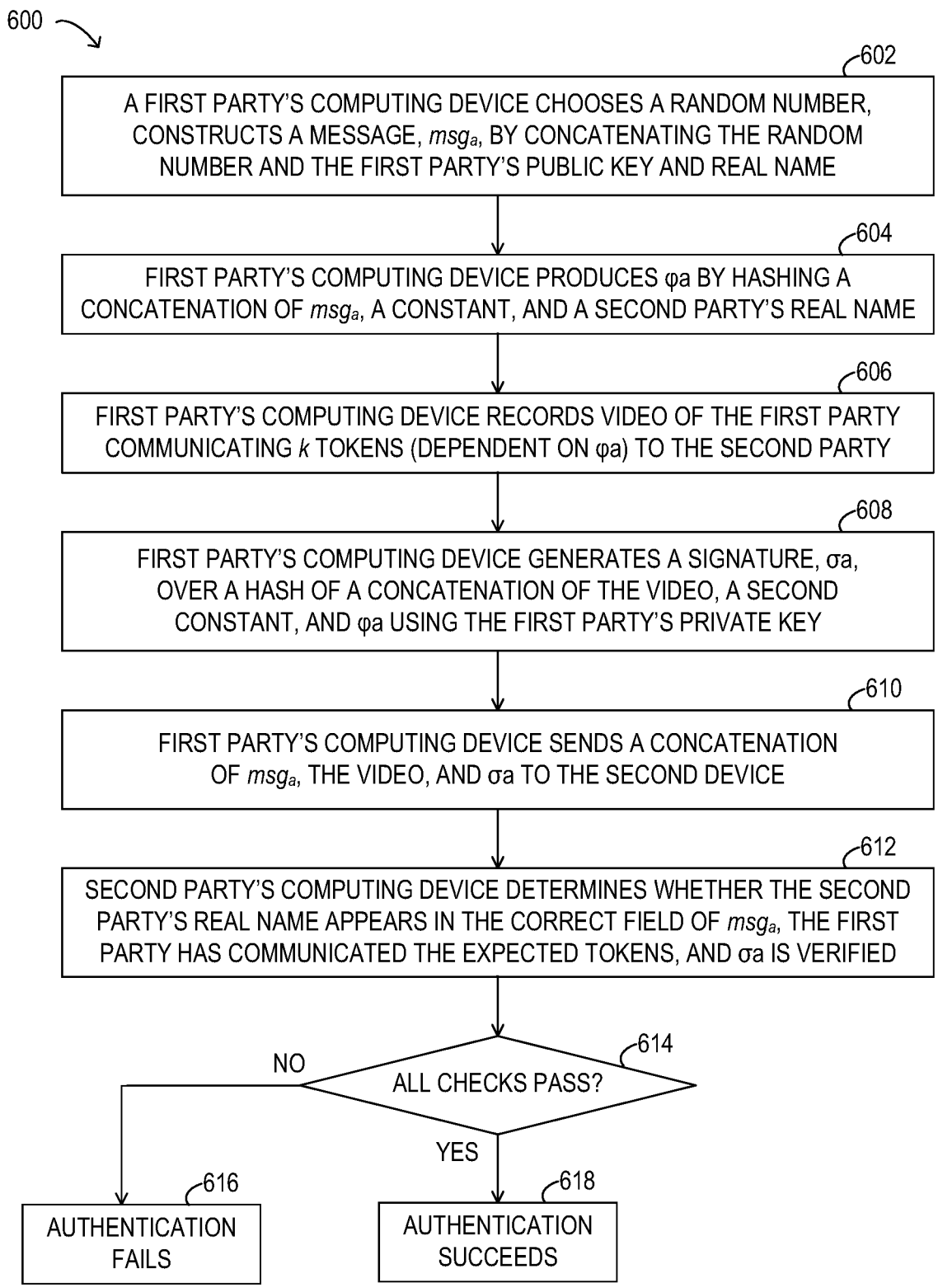
FIG. 6 is flow diagram illustrating selected elements of a method for authentication of two parties to a secure transaction in accordance with a two-way, non-interactive, out-of-band user interaction protocol, according to some embodiments.

In a non-interactive variant of the out-of-band user interaction protocol, each of the two parties may be prompted to record a video or voice memo during performance of the actions prescribed by the protocol, which they send to the other party, and the verification step may take place at a later date. In this example embodiment, the synchronous video call is removed. An example embodiment that implements a two-way, non-interactive protocol is illustrated in FIG. 6 and described below.

In another variant, the video evidence captured by a first party may depict the first party holding up a driver's license while reading the prescribed security words, or the first party may transmit an image of their driver license or another identity document. The party performing the verification may then match the drivers document against the video image of the first party.

In any of these variants, there may be different methods for implementing the underlying cryptographic protocol and the proof of its security including, but not limited to, those described herein.

Figure 3:
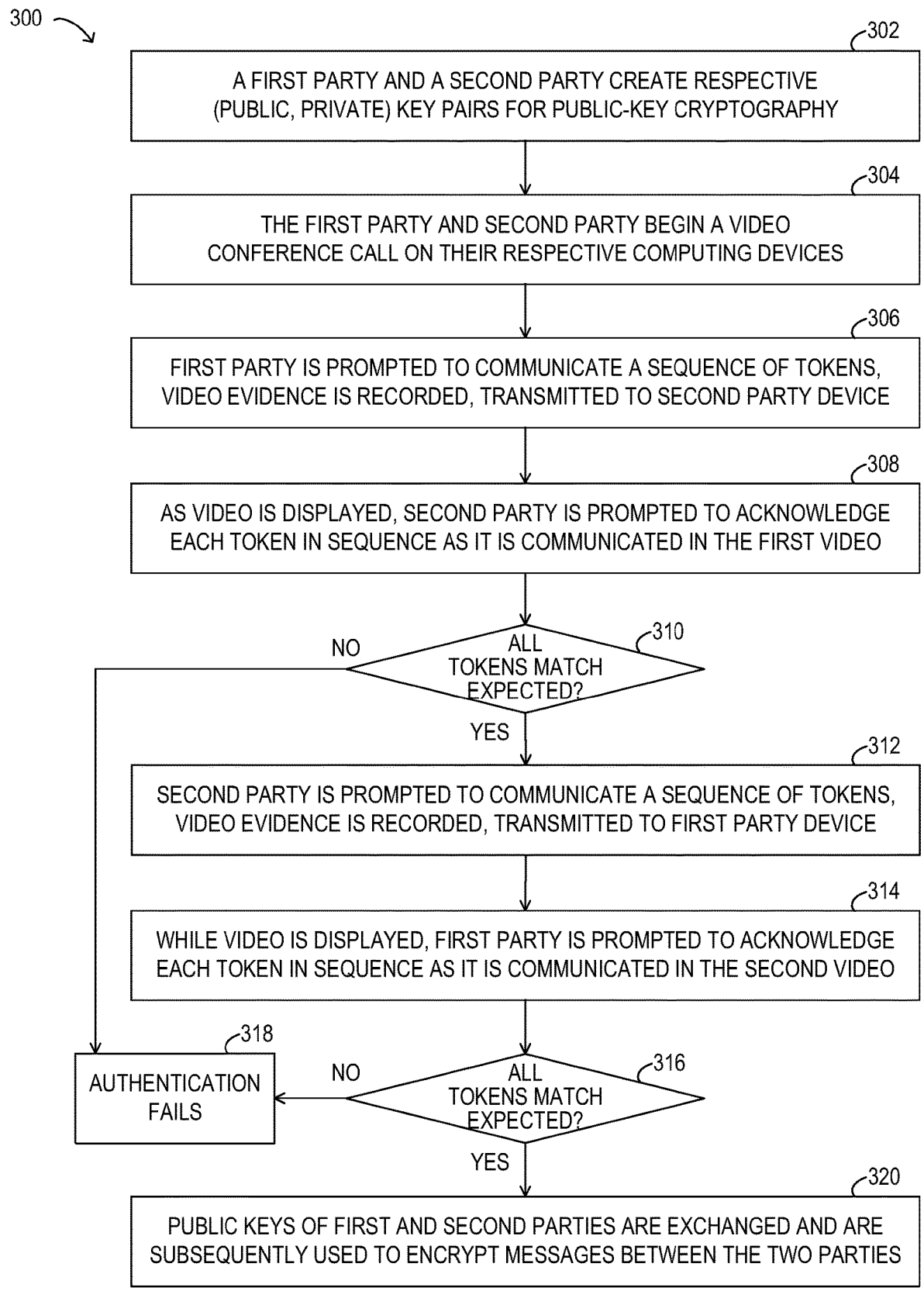
FIG. 3 is flow diagram illustrating selected elements of an embodiment of a method for exchanging encryption keys using a two-way, out-of-band user interaction.

FIG. 3 is flow diagram illustrating selected elements of an embodiment of a method 300 for exchanging encryption keys using a two-way, out-of-band user interaction. In various embodiments, operations of method 300 may be performed by one or more authentication agents executing on respective computing devices of two parties to a secure transaction. Method 300 may be performed once or repeatedly to exchange encryption keys between different pairs of parties to respective secure transactions. It is noted that certain operations described in method 300 may be optional or may be rearranged in different embodiments.

As illustrated in FIG. 3, method 300 may include, at 302, a first party and a second party creating respective (public, private) key pairs for public-key cryptography. In various embodiments, the (public, private) key pairs may be generated using any suitable method including, but not limited to, those described herein.

At 304, the method may include the first party and second party beginning a video conference call on their respective computing devices. In some embodiments, authentication agents may initiate the video conference call via an application executing on respective computing devices of the two parties (e.g., on their phones) or through browsers executing on respective desktop computers of the two parties. In some embodiments, the second party may initiate a video call to the first party, or vice versa, in response to a prompt from an instance of an authentication agent executing on their computing device. In some embodiments, the video call may be initiated using phone numbers or handles for one or more of the parties that are registered at a webserver of an authentication service on behalf of the parties.

At 306, method 300 may include the first party being prompted (e.g., by an authentication agent executing on their computing device) to communicate a sequence of tokens, as described herein. Video evidence of the communication may be recorded by the computing device of the first party and transmitted to a computing device of the second party. In various embodiments, communicating the sequence of tokens may include reading a sequence of numbers, strings, or words out loud while being recorded by a video camera or voice recorder, or speaking the names of animals or objects depicted in a sequence of images while being recorded by a video camera or voice recorder, for example. In some embodiments, in order to combat the use of voice synthesis techniques by a malicious actor, in addition to or instead of the first party reciting various words identifying the sequence of tokens, the first party may sign numbers or words, trace letters in the air to select or spell the names of animals or objects, point to physical pictures representing the tokens, or display a sequence of images depicting various types of tokens while being recorded by a video camera, for example.

At 308, while the video is displayed on the computing device of the second party, the second party may be prompted to acknowledge each token in sequence as it is communicated in the video evidence. For example, the second party may be prompted to enter, through a user interface of an authentication agent executing on their computing device, information identifying the tokens communicated by the first party. Example of such user interfaces include, but are not limited to, text boxes into which the second party types a number, a string, or the name of an animal or object, touch screen elements (e.g., soft keys, or "swiping" elements) through which the second party selects each token in the sequence from a display including the expected token and other randomly selected tokens (e.g., a list, grid, or matrix arrangement of elements representing various tokens through which the second party may swipe a path while touching the tokens in the correct temporal sequence), or a voice recognition interface configured to recognize the names of various tokens when spoken by the second party.

If, at 310, it is determined that all tokens observed by the second party match the expected sequence of tokens, method 300 may continue at 312. Otherwise, the method may proceed to 318.

At 312, method 300 may include the second party being prompted (e.g., by an authentication agent executing on their computing device) to communicate a sequence of tokens, as described herein. Video evidence of the communication may be recorded by the computing device of the second party and transmitted to a computing device of the first party.

At 314, while the video is displayed on the computing device of the first party, the first party may be prompted to acknowledge each token in sequence as it is communicated in the second video evidence. For example, the first party may be prompted to enter, through a user interface of an authentication agent executing on their computing device, information identifying the tokens communicated by the second party, as described herein.

If, at 316, it is determined that all tokens observed by the first party match the expected sequence of tokens, method 300 may continue at 320. Otherwise, the method may proceed to 318.

At 318, in response to determining that not all tokens observed by the first party match the expected sequence of tokens, the authentication fails. In this case, the encryption keys are not successfully exchanged and will not be subsequently used to encrypt messages between the two parties.

At 320, in response to the successful result of the out-of-band user interaction, the method may include exchanging the public keys of first and second parties and subsequently using those to encrypt messages exchanged between the two parties. For example, in response to the successful result of the out-of-band user interaction, an authenticated, encrypted communication channel may be established between the computing device of the first party and the computing device of the second party.

In some embodiments of method 300 in which the two parties know each other well enough to recognize each other's voices, rather than performing the out-of-band user interaction during a live-streaming video chat or by recording (and subsequently playing back) a video memo, the out-of-band user interaction may be performed during a live-streaming audio call or by recording (and subsequently playing back) a voice memo.

In some embodiments, the process of key-sharing described herein may be extended further to include any arbitrarily number of individuals. In certain applications, users might wish to express constraints on the way in which key-sharing can occur. Some such constraints are described in reference to particular use cases below.

In some embodiments, the authentication techniques described herein may be instantiated to support features such as the revocation of delegated keys and zero-knowledge key exchanges (which may allow the details of the path connecting two individuals to be hidden). In instances that support delegation, a third party may carry out the out-of-band user interaction described above with a first party, after which the first party may send the second party's public key to the third party and may send the third party's public key to the second party. Subsequently, the second party and the third party may communicate with each other directly, and may each receive certain assurances that the first party has successfully carried out the interaction described above with the second party and with the third party, respectively.

Figure 4:
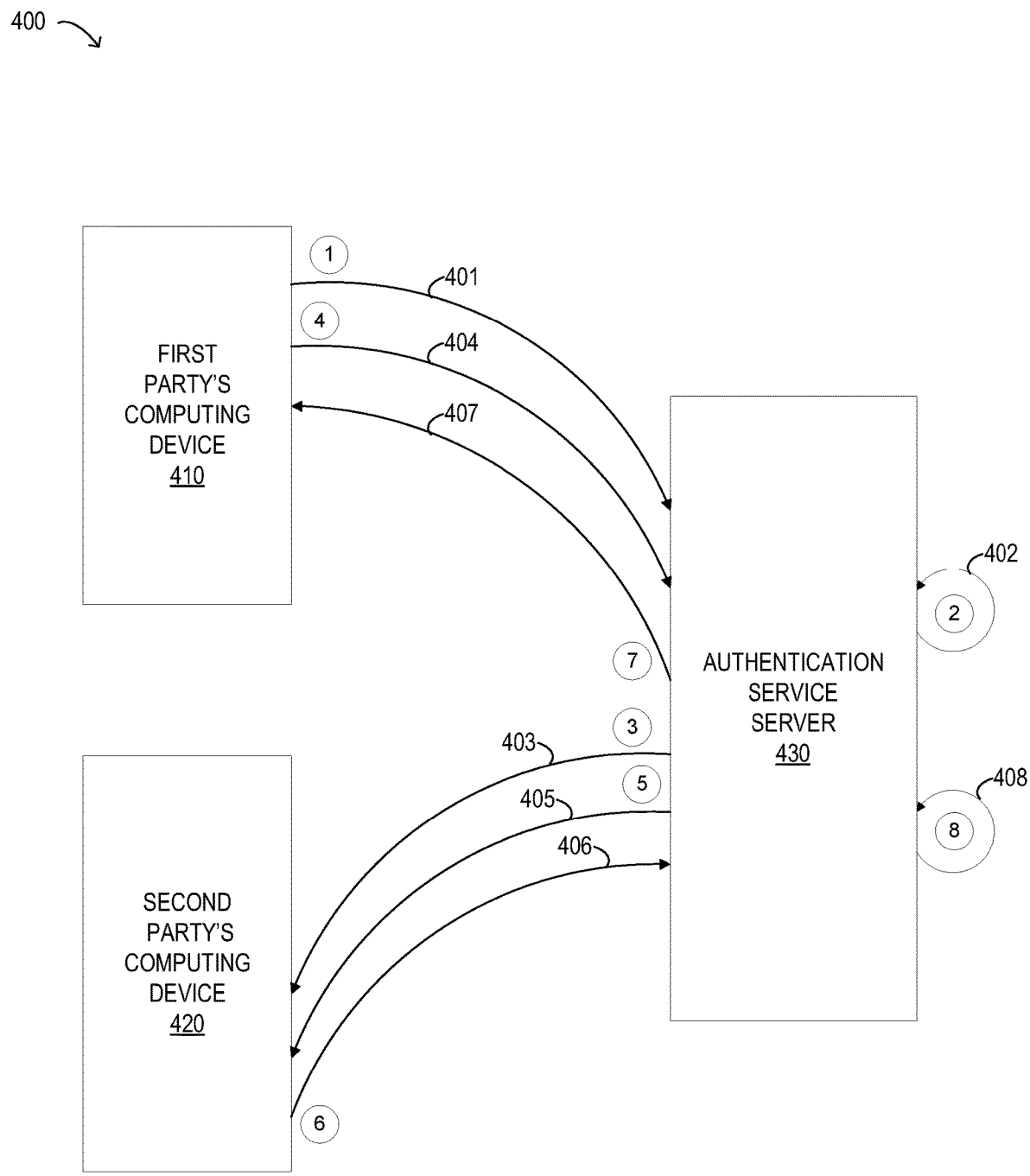
FIG. 4 is a data flow diagram illustrating various interactions between selected elements of an embodiment of system for authenticating a party to a transaction using an out-of-band user interaction.

FIG. 4 is a data flow diagram 400 illustrating various interactions between selected elements of an embodiment of system for authenticating a party to a transaction using an out-of-band user interaction. In this example, the out-of-band user interaction involves a third party to the transaction, specifically, a third-party authentication service to which some responsibilities associated with authenticating a party to the transaction have been delegated.

In a first step, a computing device of the third-party authentication service, shown as authentication service server 430, may receive, from the first party's computing device 410, a public key, a collection of tokens, and an identifier of a second party to authenticate the first party. This interaction is shown as 401.

In a second step, authentication service server 430 may obtain details about the second party's computing device 420 based on the received identifier of the second party. This action is shown as 402. In some embodiments, obtaining details about the second party's computing device 420 may include accessing a look-up table (not shown in FIG. 4) that is maintained by the authentication service server 430 and contains information about registered users of the authentication service, such as phone numbers, device identifiers, handles, and/or other information associated with computing devices of the registered users.

In a third step, authentication service server 430 may transmit the first party's public key and the collection of tokens to the second party's computing device 420 using the details obtained in the second step. This interaction is shown as 403.

In a fourth step, authentication service server 430 may receive, from the first party's computing device 410, video or audio information, such as a video stream, a pre-recorded video memo, a video transcript, an audio stream, a pre-recorded voice memo, or an audio transcript. This interaction is shown as 404. In some embodiments, the video or audio information may represent video or audio evidence captured in accordance with an out-of-band user interaction protocol, such as a video memo depicting the first party communicating selected ones of the collection of tokens in a sequence determined by an authorization agent (not shown) executing on the first party's computing device 410 or a voice memo in which the first party can be heard communicating selected ones of the collection of tokens in a sequence determined by an authorization agent (not shown) executing on the first party's computing device 410.

In a fifth step, authentication service server 430 may transmit the video or audio information to the second party's computing device 420, in accordance with the out-of-band user interaction protocol. This interaction is shown as 405.

In a sixth step, authentication service server 430 may receive, from the second party's computing device 420, an indication of a result of the authentication of the first party that is in progress. For example, the indication may reflect whether a sequence of tokens communicated by the first party, as observed or heard by the second party in the video or audio information, matches a sequence of tokens that was expected to be communicated by the first party in accordance with the out-of-band user interaction protocol. This interaction is shown as 406.

In a seventh step, authentication service server 430 may transmit the indication of the authentication result to the first party's computing device 410. This interaction is shown as 407. In some embodiments, the first party's computing device 410 may be configured to display the indication of the authentication result to inform the first party as to the status of the authentication.

In an eighth step, authentication service server 430 may (optionally), store a transcript of the authentication exercise including the public key, the collection of tokens, the messages illustrated as being transmitted between the first party's computing device 410, the second party's computing device 420, and authentication service server 430 and/or the video or audio information. This action is shown as 408.

In some embodiments, at least some of the messages illustrated as being transmitted between the first party's computing device 410, the second party's computing device 420, and authentication service server 430 may be encrypted using a public key of the second party (if known by authentication service server 430). In embodiments that implement a two-way out-of-band user interaction protocol, the interactions illustrated in FIG. 4 and described above may be repeated with the first party's computing device 410 and the second party's computing device 420 exchanging roles.

There are multiple ways in which the authenticated channels described herein may be constructed, in different embodiments. Several examples of the construction of an authenticated channel in a setting in which there are two participants (e.g., Alice and Bob) who have symmetric experiences are described below. In these examples, the following may be assumed:

1. Alice and Bob know one another by sight or through conversation
2. Alice and Bob have a shared (public), 1024-entry word list
3. Alice and Bob each have a (public, private) key pair $(PK_x, SK_x)$ for signing.

These are the public keys that Alice and Bob will exchange as part of the out-of-band user interaction protocol. In these examples, $PK_x$ is a public key for party X and $SK_x$ is the corresponding private key. In some embodiments, the protocol may assume 4096-bit Rivest-Shamir-Adleman (RSA) keys.

4. Alice and Bob know a Diffie-Hellman group $\mathbb{G} = \langle g \rangle$, $|\mathbb{G}| = q$ In these examples, g is a generator of the group, and q is the group's order. In some embodiments, the Diffie-Hellman group may be assumed to be an X25519 Diffie-Hellman group.

The primitives used in the protocol descriptions presented below are defined as follows:

$Cert_x$ represents a certificate from a trusted authority a∥b represents a concatenation of a and b H(m) represents a hash digest of m $Sign_{SK_x}(m)$ represents m signed under key $SK_x$ $PAD_a$, $PAD_b$, $PA \stackrel{\$}{\leftarrow}$ are constants In some embodiments, each of the constants shown as PAD_ may be associated with a respective party to a given transaction or with a respective object (e.g., a document, message, video memo, voice memo, or transcript) associated with a given transaction. Each of the constants shown as PAD_ may have a different pre-determined value that distinguishes it from the other constants. In one example, $PAD_a$, $PAD_b$, $PA \stackrel{\$}{\leftarrow}$ may have values of 0xA5, 0x5A, and 0x96, respectively. In some embodiments, these constants may be used as an identifier of a particular party or object of a given transaction.

In the following protocols, the construct ⟨alice⟩ may be replaced with one party's real name, and the construct ⟨bob⟩ may likewise be replaced with the other party's real name. Strings shown in quotes may be considered literals.

Two-way protocols establish mutual authentication. The out-of-band user interaction protocols described herein rely on either a face-to-face conversation or an interactive video chat. In the video case, subverting the protocol would require generating a convincing fake video/audio stream in real time. Note, however, that if a user is insufficiently attentive, an attacker might be able to subvert the protocol by replacing only the audio stream, which is significantly easier. One approach to hardening the protocol against audio-only replacement may involve the use of sign language. The non-interactive out-of-band user interaction protocols described herein use recorded video or audio and may therefore be vulnerable to offline video or audio forgery, in some cases.

FIGS. 5A to 5C illustrate a flow diagram illustrating selected elements of an embodiment of a method 500 for mutual authentication of two parties to a secure transaction in accordance with a two-way, interactive, out-of-band user interaction protocol. In various embodiments, operations of method 500 may be performed by one or more authentication agents executing on the computing devices of the two parties to the secure transaction and/or by one or more authentication agents executing on a computing device of a third party to the secure transaction, such as a rendezvous device or a computing device of a third-party authentication service. Method 500 may be performed once or repeatedly to authenticate parties to respective secure transactions. It is noted that certain operations described in method 500 may be optional or may be rearranged in different embodiments.

At 502, illustrated in FIG. 5A, a first party's computing device chooses a random number, a, as shown below, and determines a corresponding Diffie-Hellman group element, $g^a$ $$a \stackrel{\$}{\leftarrow} \{1, \ldots, q-1\}$$

At 504, the first party's computing device constructs a message, $msg_a$, by concatenating 'PING', the Diffie-Hellman group element, $g^a$, and first party's public key and real name, as shown below, then sends $msg_a$ to second party's computing device.

$$msg_a := \text{'PING'} \| g^a \| PK_a \| \langle \text{alice} \rangle$$

At 506, the second party's computing device chooses a random number, b, as shown below, and determines a corresponding Diffie-Hellman group element, $g^b$ $$b \stackrel{\$}{\leftarrow} \{1, \ldots, q-1\}$$

At 508, the second party's computing device constructs a message, $msg_b$, by concatenating 'PONG', the Diffie-Hellman group element, $g^b$, and the second party's public key and real name, as shown below, and sends $msg_b$ to first party's computing device.

$$msg_b := \text{'PONG'} \| g^b \| PK_b \| \langle \text{bob} \rangle$$

At 510, the second party's computing device computes $g^{ab}$, produces φb by hashing a concatenation of $msg_b$, $msg_a$, $PAD_b$, and $g^{ab}$, as shown below, and may also produce φa by hashing a concatenation of $msg_a$, $msg_b$, $PAD_a$, and $g^{ab}$, as shown below.

$$\varphi_b \leftarrow H(msg_b \| msg_a \| PAD_b \| g^{ab})$$

$$\varphi_a \leftarrow H(msg_a \| msg_b \| PAD_a \| g^{ab})$$

At 512, the second party's computing device generates $\sigma_b$ by signing $\varphi_b$ with the second party's private key, as shown below, and sends $msg_b$ and $\sigma_b$ to first party's computing device.

$$\sigma_b \leftarrow Sign_{SK_b}(\varphi_b)$$

At 514, the first party's computing device computes $g^{ab}$, produces φa by hashing a concatenation of $msg_a$, $msg_b$, $PAD_a$, and $g^{ab}$, and may also produce φb by hashing a concatenation of $msg_b$, $msg_a$, $PAD_b$, and $g^{ab}$, as shown below.

$$\varphi_a \leftarrow H(msg_a \| msg_b \| PAD_a \| g^{ab})$$

$$\varphi_b \leftarrow H(msg_b \| msg_a \| PAD_b \| g^{ab})$$

At 516, method 500 may include beginning a video call during which the two parties perform actions in accordance with an out-of-band user interaction protocol.

As illustrated in FIGS. 5B and 5C and described in more detail below, after the first two messages are exchanged, as described above, the first party (e.g., Alice) may read the first k times 10 bits of $\varphi_a$ to the second party (e.g., Bob) by reading k words from the shared word list during a video chat. Bob may then input an identifier of each of the words read by Alice during the video chat to his computing device. Subsequently, Bob may read the first k times 10 bits of $\varphi_b$ to Alice by reading k words from the shared word list. Alice may then input an identifier of each of the words read by Bob during the video chat to her computing device. The protocol may be aborted at any time if Bob enters a word that does not agree with the value that Bob's computing device expects or if Alice enters a word that does not agree with the value that Alice's computing device expects. In some embodiments, the value of k may be in the range of 2 to 10 (e.g., 5).

At 518, illustrated in FIG. 5B, the first party's computing device chooses a value, i, by regarding the first n bits of φa as an integer, displays the $i^{th}$ token and prompts the first party to communicate the token to the second party. At 520, the second party's computing device chooses a value, j, by regarding the first (or next) n bits of φa as an integer. In some embodiments, the value of n may be 10, and the integer corresponding to each group of 10 bits may be used to select the first, and each successive one, of the tokens in the sequence of tokens to be displayed by the first party's device. Note that, in this example embodiment, if and only if Alice's computing device and Bob's computing device agree on the value of the first 10 bits of φa, j has the same value that Alice's computing device chose for i at 518.

At 522, the second party acknowledges the displayed token on the second party's computing device (e.g., by typing in a name or identifier of the displayed token). At 524, the second party's computing device determines whether the $j^{th}$ token matches the displayed (acknowledged) token.

If, at 526, it is determined that the tokens match, method 500 may continue at 530. Otherwise, the method may proceed to 528. At 528, the authentication fails, and the method may include returning an indication of the failure to the first party's computing device (not shown in FIG. 5B).

If, at 530, there are more tokens in the sequence to be displayed, method 500 may continue at 532. Otherwise, if (or once) there are no additional tokens in the sequence to be displayed, the method may include continuing the out-of-band user interaction (e.g., in the other direction), as in 534.

At 532, the first party's computing device chooses next value, i, by regarding the next n bits of φa as an integer, displays the $i^{th}$ token, and prompts the first party to communicate the token to the second party, after which the method returns to 520 and the operations shown as 520-534 may be repeated, as appropriate, one or more times.

At 536, illustrated in FIG. 5C, the second party's computing device chooses a value, i, by regarding the first n bits of φb as an integer, displays the $i^{th}$ token, and prompts the second party to communicate the token to the first party. At 538, the first party's computing device chooses a value, j, by regarding the first (or next) n bits of φb as an integer. In some embodiments, the value of n may be 10, and the integer corresponding to each group of 10 bits may be used to select the first, and each successive one, of the tokens in the sequence of tokens to be displayed by the second party's device.

At 540, the first party acknowledges the displayed token on first device. At 542, the first party's computing device determines whether the $j^{th}$ token matches the displayed (acknowledged) token.

If, at 544, it is determined that the tokens match, method 500 may continue at 548. Otherwise, the method may proceed to 562. If, at 548, there are more tokens in the sequence to be displayed, method 500 may continue at 550. Otherwise, if (or once) there are no additional tokens in the sequence to be displayed, the method may proceed to 552.

At 550, the second party's computing device chooses next value, i, by regarding the next n bits of φb as an integer, displays $i^{th}$ token, and prompts the second party to communicate the token to the first party, after which method 500 returns to 538 and the operations shown as 538-562 may be repeated, as appropriate, one or more times.

At 552, the first party's computing device determines whether $\sigma_b$ is a correct signature on φb. If, at 554, it is determined that $\sigma_b$ is correct, method 500 may continue at 556. Otherwise, the method may proceed to 562.

At 556, the first party's computing device generates $\sigma_a$ by signing φa with first party's private key, as shown below, and sends $\sigma_a$ to second party's computing device.

$$\sigma_a \leftarrow \text{Sign}_{SK_a}(\varphi_a)$$

As illustrated in this example, Alice's and Bob's computing devices may check the token values they observe against the values they have computed from their transcript of the machine protocol. If everything matches and $\sigma_a$ verifies, Alice's computing device sends $\sigma_a$ to Bob's computing device, which is his indication that the protocol succeeded. Note that, at this point, Alice already knows that Bob's verification succeeded, otherwise Bob's computing device would have aborted the protocol prior to reading $\varphi_b$ to Alice.

At 558, the second party's computing device determines whether $\sigma_a$ is a correct signature on φa. If, at 560, is it determined that $\sigma_a$ is a correct signature on φa, method 500 may continue at 564. Otherwise, the method may proceed to 562. At 562, the authentication fails, and the method may include returning an indication of failure to the second party's computing device (not shown in FIG. 5C).

At 564, the authentication succeeds, and the method may include returning an indication of success to the second party's computing device (not shown in FIG. 5C). As a result of this success, the first party and the second party will have successfully exchanged public keys, and an authenticated, encrypted communication channel may be established between the computing device of the first party and the computing device of the second party. Thereafter, the first and second parties may communicate securely by sending messages to each other that are encrypted using the public keys.

In the example embodiment illustrated in FIGS. 5A-5C and described above, since Alice's and Bob's computing devices both know φa and φb, the task of acknowledging the tokens may be made easier for Alice and Bob. Specifically, when Bob's computing device chooses the $j^{th}$ word from the shared word list at 520, it may also choose f other distinct random words from the shared word list. For example, in some embodiments, f may be in the range of 3 to 7 words. Bob's computing device may shuffle these f+1 words and display them to Bob, who can simply select the word Alice has read him rather than typing it in. In one example, for each of the k words, Bob's computing device may choose five other distinct random words and may display a shuffled version of the set as {expected, random$_1$, ..., random$_\ell$ }, Alice's computing device may do likewise when the roles are reversed.

FIG. 6 is flow diagram illustrating selected elements of a method 600 for authentication of two parties to a secure transaction in accordance with a two-way, non-interactive, out-of-band user interaction protocol, according to some embodiments. In this example embodiment, each party to a secure transaction prepares a message, records a video, and generates a signature over both. One side of the two-way protocol is defined below. The operations shown in FIG. 6 may then be repeated with the parties swapping roles. In various embodiments, operations of method 600 may be performed by one or more authentication agents executing on the computing devices of the two parties to the secure transaction and/or by one or more authentication agents executing on a computing device of a third party to the secure transaction, such as a rendezvous device or a computing device of a third-party authentication service. Method 600 may be performed once or repeatedly to authenticate parties to respective secure transactions. It is noted that certain operations described in method 600 may be optional or may be rearranged in different embodiments.

As illustrated in FIG. 6, method 600 may include, at 602, a first party's computing device choosing a random number, $r_a$, and constructing a message, msg$_a$, by concatenating the random number and the first party's public key and real name, as shown below.

$$r_a \xleftarrow{\$} \{0,1\}^{256}$$

$$\text{msg}_a := r_a \| PK_a \| \langle \text{alice} \rangle$$

At 604, the first party's computing device produces φa by hashing a concatenation of $msg_a$, a constant, and a second party's real name, as shown below.

$$\varphi_a \leftarrow H(msg_a \| PAD_a \| \langle bob \rangle)$$

At 606, the first party's computing device records a video, shown below, of the first party communicating k tokens (which are dependent on φa) to the second party.

$$\mathcal{V} \leftarrow \text{video of Alice reading 10 times k bits of } \varphi_a \text{ to Bob}$$

At 608, the first party's computing device generates a signature, σa, over a hash of a concatenation of the video, a second constant, and φa using the first party's private key, as shown below.

$$\sigma_a \leftarrow \text{Sign}_{SK_a}(H(\mathcal{V} \| PAD_{\mathcal{V}} \| \varphi_a))$$

At 610, the first party's computing device sends a concatenation of $msg_a$, the video, and σa, shown below, to the second device.

$$msg_a \| \mathcal{V} \| \sigma_a \text{ to B}$$

At 612, the second party's computing device determines whether the second party's real name appears in the correct field of $msg_a$, whether the first party has communicated the expected tokens, and whether the signature, $\sigma_a$, is verified. The first check ensures that an attacker who finds a collision for $\varphi_a$ cannot convince anyone other than the second party to accept the attacker's public key in place of the first party's public key.

If, at 614, is it determined that all of the checks shown in 612 pass, method 600 may continue at 618. Otherwise the method may proceed to 616. At 616, the authentication fails, and the method may include returning an indication of failure to the first party's computing device (not shown in FIG. 6).

At 614, the authentication succeeds, so far, and the method may include returning an indication of success to the first party's computing device (not shown in FIG. 6). In this case, the operations shown is FIG. 6 may be repeated with the roles of the first party and the second party being reversed. If the authentication succeeds with the roles reversed, the authentication succeeds, and the method may include returning an indication of success to the first party's computing device (not shown in FIG. 6).

One-way protocols establish one-way authentication. These out-of-band user interaction protocols may be suitable for use in the case that one party is already authenticated. Examples of these asymmetric interaction patterns are described below. The following protocol descriptions assume that Bob has a public key in the form of a certificate, $Cert_b$, which is signed by a trusted authority. Alternatively, Alice may already know Bob's public key (for example, because it was shipped along with her client software). In that case, $Cert_b$ may be replaced with $PK_b \| \langle bob \rangle$, for example.

In one example embodiment that implements a one-way interactive protocol, the computing device of party A (e.g., Alice) may perform the following operations, after which party A's computing device may send $msg_a$ to the computing device of party B (e.g., Bob):

$$a \xleftarrow{\$} \{1, \ldots, q-1\}$$

$$msg_a := \text{`PING'} \| g^a \| PK_a \| \langle alice \rangle$$

The computing device of party B may perform the following operations, after which party B's computing device may send $msg_b \| \sigma_b$ to A:

$$b \xleftarrow{\$} \{1, \ldots, q-1\}$$

$$msg_b := \text{`PONG'} \| g^b \| Cert_b$$

$$\varphi_b \leftarrow H(msg_b \| msg_a \| PAD_b \| g^{ab})$$

$$\sigma_b \leftarrow \text{Sign}_{SK_b}(\varphi_b)$$

The computing device of party A may perform the following operations, after which party A's computing device may send $\sigma_a$ to B:

$$\varphi_a \leftarrow H(msg_a \| msg_b \| PAD_a \| g^{ab})$$

$$\sigma_a \leftarrow \text{Sign}_{SK_a}(\varphi_a)$$

Following the operations and exchange of messages shown above, an out-of-band user interaction between Bob and Alice may be initiated. For example, Alice may read 10 times k bits of $\varphi_a$ to Bob as k security words via live video chat, as described above, and Bob may provide input acknowledging the reading of the security words. If the acknowledged security words match the expected security words, the interaction may be successful.

In some embodiments in which the two parties know each other well enough to recognize each other's voices, rather than performing the out-of-band user interaction during a live-streaming video chat or by recording (and subsequently playing back) a video memo, the out-of-band user interaction may be performed during a live-streaming audio call or by recording (and subsequently playing back) a voice memo. In some embodiments, this protocol may include an optional confirmation operation in which party B's computing device sends $\text{Sign}_{SK_b}(\sigma_a)$ back to the computing device of party A.

In a one-way, non-interactive protocol, Alice may be presumed to have a certificate for Bob. If the public key in Bob's certificate also supports encryption, Alice can encrypt her message to Bob in the usual manner (e.g., by generating a random key, encrypting the key under Bob's public key, encrypting her message under the random key, and sending both ciphertexts to Bob).

In one example embodiment, the computing device of party A (e.g., Alice) may perform the following operations, after which party A's computing device may send $msg_a \| \mathcal{V} \| \sigma_a$ to the computing device of party B (e.g., Bob).

$$r_a \xleftarrow{\$} \{0,1\}^{256}$$

$$msg_a := r_a \| PK_a \| \langle alice \rangle$$

$$\varphi_a \leftarrow H(msg_a \| PAD_a \| \langle bob \rangle)$$

$$\mathcal{V} \leftarrow \text{video of Alice reading 10 times k bits of } \varphi_a \text{ to Bob}$$

$$\sigma_a \leftarrow \text{Sign}_{SK_a}(H(\mathcal{V} \| PAD_{\mathcal{V}} \| \varphi_a))$$

In some of the example embodiments described below, the construct $\text{Enc}_k(m)$ may represent the encryption of m under some number of bits of key k (e.g., 128 bits of) using AES-128 in an authentication-encryption mode. In some embodiments, the use of AES-GCM (i.e., AES "Galois Counter Mode") encryption may be assumed.

In some embodiments, the authentication techniques described herein may support verifiability and/or non-repudiability. In these example embodiments, either party A or party B can prove to a third party C that a particular message was sent via a channel established using an out-of-band user interaction protocol as described above. In other words, party A or party B can prove to a third party C that the keys used to encrypt the message were exchanged via the interaction described. Once party C has this proof, party C can, in turn, prove to others that party A and party B actually completed the protocols and exchanged keys.

In one example embodiment, a person holding a transcript of the full interaction (including video and/or audio evidence of the actions taken) can prove that the people in the video or audio must have carried out the key exchange implemented by that transcript. In this variant, Alice and Bob communicate through a third-party "rendezvous server" that records the plaintext of all traffic between them. This protocol does not require the third party to be honest, but the third party does learn what Alice and Bob say, which contributes to the verifiability and/or non-repudiability of the protocol.

In this example embodiment, the computing device of party A (e.g., Alice) may perform the following operations, after which party A's computing device may send $msg_a$ to the computing device of party B (e.g., Bob).

$$a \xleftarrow{\$} \{1, \ldots, q-1\}$$

$$msg_a := \text{'PING'} \| g^a \| PK_a \| \langle \text{alice} \rangle$$

The computing device of party B may perform the following operations, after which party B's computing device may send $msg_b$ to the computing device of party A.

$$b \xleftarrow{\$} \{1, \ldots, q-1\}$$

$$msg_b := \text{'PONG'} \| g^b \| PK_b \| \langle \text{bob} \rangle$$

$$\varphi_b \leftarrow H(msg_b \| msg_a \| PAD_b \| g^{ab})$$

The computing device of party A may perform the following operation, after which party A's computing device may send $\sigma_a$ to the computing device of party B.

$$\varphi_a \leftarrow H(msg_a \| msg_b \| PAD_a \| g^{ab})$$

Following the operations and exchange of messages shown above, an out-of-band user interaction between party A and party B may be initiated. After successfully completing the out-of-band user interaction protocol, the computing device of party A may perform the following operation.

$$\sigma_a \leftarrow \text{Sign}_{SK_a}(\varphi_a \| \mathcal{V}_a)$$

In this example, $\mathcal{V}_a$ represents party A's view of the confirmation interaction captured on video. Each frame of the video may be associated with a unique frame ID. Each time party A's computing device displays a frame, it may record the unique ID and hash the contents of the frame into a running digest. Then:

$$\mathcal{V}_a := \langle \text{displayed frame list} \rangle \| H(\text{all displayed frames}).$$

The computing device of party B may construct $\mathcal{V}_b$ in a similar manner. In this example, party A's computing device sends $\sigma_a \| \mathcal{V}_a$ to the third party, which then forward this message to the computing device of party B.

The computing device of party B may perform the following operation, after which the computing device of party B may send $\sigma_b \| \mathcal{V}_b$ to the third party, which then forwards this message to the computing device of party A.

$$\sigma_b \leftarrow \text{Sign}_{SK_b}(\varphi_b \| \mathcal{V}_a \| \mathcal{V}_b \| \sigma_a)$$

Finally, the computing device of party A may release a to the third party to complete the protocol.

In this example embodiment, Alice may read 10 times k bits of $\varphi_a$ to Bob as k security words, and Bob may ready k bits of $\varphi_b$ to Alice as k security words. Once Alice has confirmed receiving the correct $\varphi_b$, she may continue the protocol by sending a signature over $\varphi_a$ and $\mathcal{V}_a$.

With this protocol, every frame displayed on Alice's computing device must have come from Bob via the third party, meaning that both Bob and the third party must have seen the contents of the frames identified in $\mathcal{V}_a$. Similarly, every frame displayed on Bob's computing device must have come from Alice via the third party, meaning that both Alice and the third party must have seen the contents of the frames identified in $\mathcal{V}_b$. This means that Alice, Bob, and the third party can all verify the signatures.

Note that the third party (which may, for example, be Alice's bank or a transaction authentication service) knows how many frames it sent to Alice and how many Alice displayed. Therefore, the third party can reject Alice's transcript if it thinks Alice is trying to construct the frame list dishonestly. Similarly, the third party knows how many frames it sent to Bob and how many Bob displayed. Therefore, the third party can reject Bob's transcript if it thinks Bob is trying to construct the frame list dishonestly.

In some embodiments, the third party may construct an attestation to a key agreement by recording the entire transcript (including frames referenced by $\mathcal{V}_a$ and $\mathcal{V}_b$). To do this, the third party needs a, which Alice releases to the third party when the protocol is complete. Under the assumption that, taking the video as ground truth it hard to create a fake transcript, the attestation that the third party records may demonstrate that Alice and Bob performed a particular transaction without requiring Bob to have any established trust relationship with the third party. For example, if the protocol is performed to authenticate Alice and Bob as parties to a wire transfer of funds from Alice's bank to Bob, the attestation that the Alice's bank (as a third party to the transaction) records may demonstrate that Alice and Bob exchanged a particular set of wiring instructions without requiring Bob to have any established trust relationship with Alice's bank.

The non-repudiation property of the authentication techniques described herein may assume that no one can generate a fake out-of-band user interaction video; otherwise they can generate attestations for arbitrary transcripts. Several examples of methods for strengthening non-repudiation are described below.

Well-known ID. In this example, Bob and Alice have published well-known keys (e.g., on a key service). Alice and Bob each attach a signature of their final message exchanged as part of the authentication protocol for a wire transfer under their well-known keys (e.g., Alice produces $$\text{Sign}_{PK_{Keybase_a}}$$

$(\sigma_a \| \mathcal{V}_a))$. In this example, even if the bank does not know Bob, they have a strong claim that the person who owns the well-known key claims to be the person in the video of the out-of-band user interaction, i.e., that the bank did not manufacture the transcript.

Attestation ledger. In this example, the bank might instead (or also) enter a digest of the transcript of the out-of-band user interaction in an append-only ledger or block-chain. This may establish the time at which the attestation was created, but might not strongly tie Bob to a real person (e.g., the bank could produce many fake attestations).

In one example embodiment, the authentication protocol may resist computational attacks (assuming that the underlying primitives are secure and modeling SHA-256 as a random oracle). This may be achieved by leveraging the out-of-band channel to add entropy to the transcript after a point in the protocol at which a would-be attacker will have sent forged messages to Alice and Bob. Using this approach, the attack may fail unless the attacker can guess the out-of-band randomness (or can break one of the underlying cryptographic primitives, which is assumed to be infeasible).

In the following protocol, the computing devices perform certain operations, then the users perform an out-of-band user interaction, then the computing devices perform additional operations, then the users perform another out-of-band user interaction. In this example embodiment, the computing device of party A (e.g., Alice) may perform the following operations, after which party A's computing device may send $msg_a$ to the computing device of party B (e.g., Bob).

$$r_a \xleftarrow{\$} \{0,1\}^{256}$$

$$a \xleftarrow{\$} \{1, \ldots, q-1\}$$

$$msg_a := \text{'PING'} \| g^a \| PK_a \| \langle \text{alice} \rangle$$

The computing device of party B may perform the following operations, after which party B's computing device may send $msg_b$ to the computing device of party A.

$$r_b \xleftarrow{\$} \{0,1\}^{256}$$

$$b \xleftarrow{\$} \{1, \ldots, q-1\}$$

$$msg_b := \text{'PONG'} \| g^b \| PK_b \| \langle \text{bob} \rangle$$

In this example embodiment, both party A and party B may compute the following:

$$\rho_a \leftarrow H(msg_a \| msg_b \| g^{ab} \| \text{'1'})$$

$$\rho_b \leftarrow H(msg_a \| msg_b \| g^{ab} \| \text{'0'}).$$

In this example, embodiment, Alice's and Bob's computing devices use a pseudo random generator (PRG) keyed by $\rho_a$ to choose 8 words, for example, from the shared word list. Alice's computing device then chooses one of the 8 words using a PRG keyed by $r_a$ and prompts her to read that word to Bob. Bob's computing device displays the 8 words and waits for Bob's selection. Both computers save the selected word as wa, 1.

In this example, the interaction described above may be repeated k−1 (e.g., 9) further times to choose:

{wa, 2, . . . , wa, k}.

Subsequently, Bob's computing device uses $\rho_b$ and $r_b$ as described above for k rounds to choose {wb, 1, . . . , wb, k}. Then let Wa:=wa, 1∥ . . . ∥wa, k Wb:=wb, 1∥ . . . ∥wb, k If at any point Bob's computer does not offer Alice's selected word (or vice-versa), the out-of-band user interaction protocol will fail and the authentication exercise may be aborted.

The computing device of party A may subsequently perform the following operations, after which party A's computing device may send $\sigma_a$ to the computing device of party B.

$$\varphi_a \leftarrow H(msg_a \| W_a \| msg_b \| W_b \| PAD_a)$$

$$\sigma_a \leftarrow \text{Sign}_{SK_a}(\varphi_a)$$

The computing device of party B may perform the following operations, after which party B's computing device may send $\sigma_b$ to the computing device of party A.

$$\varphi_b \leftarrow H(msg_b \| W_a \| msg_a \| W_b \| PAD_b)$$

$$\sigma_b \leftarrow \text{Sign}_{SK_b}(\varphi_b)$$

Finally, in this example, party A (Alice) may read to party B (Bob) k times 6 bits of $\varphi_a$ and party B may read to party A k times bits of $\varphi_b$ (e.g., using the method described earlier to avoid typing by presenting the parties with security words each selected from a collection of tokens using 6 bits as an integer selector, as described above in reference to FIGS. 5A-5C). The computing devices may then reconstruct and check these values and the received signatures.

If the protocol successfully completes, party A and party B will have correctly exchanged public keys and proved they know their own secret keys.

This following protocol addresses issues encountered in some protocols described above. For example, this protocol eliminates (from the perspective of the users) the need for two rounds of word reading. Second, it provides privacy against a passive adversary during the key exchange (and if the exchange is successful, Alice and Bob know their exchange was private).

In this example embodiment, the computing device of party B (e.g., Bob) may perform the following operation, after which party B's computing device may send $g^b$ to the computing device of party A (e.g., Alice).

$$b \xleftarrow{\$} \{1, \ldots, q-1\}$$

The computing device of party A may perform the following operations, after which party A's computing device may send $g^a \| c_{a,1}$ to the computing device of party B.

$$r \xleftarrow{\$} \{0,1\}^{256}$$

$$a \xleftarrow{\$} \{1, \ldots, q-1\}$$

$$k_{ab} \leftarrow H(\text{'HiKE} \nu \text{ 3'} \| g^{ab})$$

$$msg_a := \text{'PING'} \| PK_a \| \langle \text{alice} \rangle$$

$$c_{a,1} \leftarrow \text{Enc}_{k_{ab}}(msg_a)$$

The computing device of party B may perform the following operations, after which party B's computing device may send $c_{b,1}$ to the computing device of party A.

$$msg_b := \text{'PONG'} \| PK_b \| \langle \text{bob} \rangle$$

$$c_{b,1} \leftarrow \text{Enc}_{k_{ab}}(msg_b)$$

The computing devices of both Alice and Bob may compute the following:

$$\rho \leftarrow H(g^b \| g^a \| c_{a,1} \| c_{b,1} \| msg_a \| msg_b \| g^{ab}).$$

In this example embodiment, as in others described above, Alice, Bob, and their computing devices may use $\rho$ and $r$ to select {wa, 1, . . . , wa, k}. Letting Wa:= wa, 1∥ . . . ∥wa, k, the computing device of party A may perform the following operations, after which party A's computing device may send $c_{a,2}$ to the computing device of party B.

$$\varphi_a \leftarrow H(g^b \| g^a \| c_{a,1} \| c_{b,1} \| msg_a \| msg_b \| W_a \| g^{ab} \| PAD_a)$$

$$\sigma_a \leftarrow \text{Sign}_{SK_a}(\varphi_a)$$

$$c_{a,2} \leftarrow \text{Enc}_{k_{ab}}(\sigma_a)$$

The computing device of party B may perform the following operations, after which party B's computing device may send $c_{b,2}$ to the computing device of party A.

$$\varphi_b \leftarrow H(g^a \| g^b \| c_{b,1} \| c_{a,1} \| msg_b \| msg_a \| W_a \| g^{ab} \| PAD_b)$$

$$\sigma_b \leftarrow Sign_{SK_b}(\varphi_b)$$

$$c_{b,2} \leftarrow Enc_{k_{ab}}(\sigma_b)$$

Finally, Alice may read to Bob the first 3k bits of $\varphi_a$, and Bob may read to Alice the first 3k bits of $\varphi_b$, and their computing devices may reconstruct and check these values and the received signatures to complete the protocol.

The following protocol adds privacy against an active attacker using the idea that each party sends commitments, and then de-commits after protocol succeeds. In this example embodiment, the computing device of party B may perform the following operation, after which party B's computing device may send $g^b$ to the computing device of party A.

$$b \xleftarrow{\$} \{1, \ldots, q-1\}$$

The computing device of party A may perform the following operations, after which party A's computing device may send $g^a \| c_{a,1}$ to the computing device of party B.

$$a \xleftarrow{\$} \{1, \ldots, q-1\}$$

$$r_a \xleftarrow{\$} \{0,1\}^{256}$$

$$c_{a,0} \leftarrow Enc_{r_a}(PK_a \| \langle alice \rangle)$$

$$Com_a \leftarrow H(g^{ab} \| PK_a \| \langle alice \rangle \| r_a)$$

$$k_{ab} \leftarrow H(\text{`HiKE} v \text{ 4'} \| g^{ab})$$

$$c_{a,1} \leftarrow Enc_{k_{ab}}(\text{`PING'} \| c_{a,0} \| Com_a)$$

The computing device of party B may perform the following operations, after which party B's computing device may send $c_{b,1}$ to the computing device of party A.

$$r_b \xleftarrow{\$} \{0,1\}^{256}$$

$$c_{b,0} \leftarrow Enc_{r_b}(PK_b \| \langle bob \rangle)$$

$$Com_b \leftarrow H(g^{ab} \| PK_b \| \langle bob \rangle \| r_b)$$

$$k_{ab} \leftarrow H(\text{`HiKE} v \text{ 4'} \| g^{ab})$$

$$c_{b,1} \leftarrow Enc_{k_{ab}}(\text{`PONG'} \| c_{b,0} \| Com_b)$$

The computing device of both Alice and Bob may compute the following:

$$\varphi_a \leftarrow H(c_{a,1} \| c_{b,1} \| g^{ab} \| Com_a \| c_{a,0} \| Com_b \| c_{b,0} \| PAD_a)$$

$$\varphi_b \leftarrow H(c_{b,1} \| c_{a,1} \| g^{ab} \| Com_b \| c_{b,0} \| Com_a \| c_{a,0} \| PAD_b).$$

Next, using the same idea as in some protocols described above, Alice may read 10k bits of $\varphi_a$ to Bob, who selects them from the choices his computing device offers. subsequently, Bob may read the first 10k bits of $\varphi_b$ to Alice. Once Alice correctly enters the bits from $\varphi_b$, her computing device (e.g., her phone) may continue the protocol. Note that Bob's computing device (e.g., his phone) will abort if it gets the wrong sequence from Alice, meaning that upon her entering the bits of $\varphi_b$, her phone should believe that Bob's phone agreed with her $\varphi_a$ value.

The computing device of party A may perform the following operations, after which party A's computing device may send $c_{a,2}$ to the computing device of party B.

$$\sigma_a \leftarrow Sign_{SK_a}(\varphi_a)$$

$$c_{a,2} \leftarrow Enc_{k_{ab}}(r_a \| \sigma_a)$$

Bob's computing device may use $r_a$ to decrypt $c_{a,0}$, then use the resulting plaintext to check $Com_a$ and verify $\sigma_a$. If all are correct, Bob's computing device may declare success and reply to that effect, otherwise, Bob's computing device may abort the protocol.

The computing device of party B may perform the following operations, after which party B's computing device may send $c_{b,2}$ to the computing device of party A.

$$\sigma_b \leftarrow Sign_{SK_b}(\varphi_b)$$

$$c_{b,2} \leftarrow Enc_{k_{ab}}(r_b \| \sigma_b)$$

Alice's computer may then take the same steps for $r_b$, $c_{b,0}$, $Com_b$, and $\sigma_b$. If all are correct, Alice's computing device may declare success and reply to that effect, otherwise, Alice's computing device may abort the protocol.

In various embodiments, the authentication techniques described herein that use out-of-band user interactions may be instantiated to support adaptations of wire transfer processes. For example, an out-of-band user interaction as above may be used to verify that a funds recipient is known to a funds originator. In some embodiment, this process may function as a secondary authorizer for wire transfers.

Figure 7A:
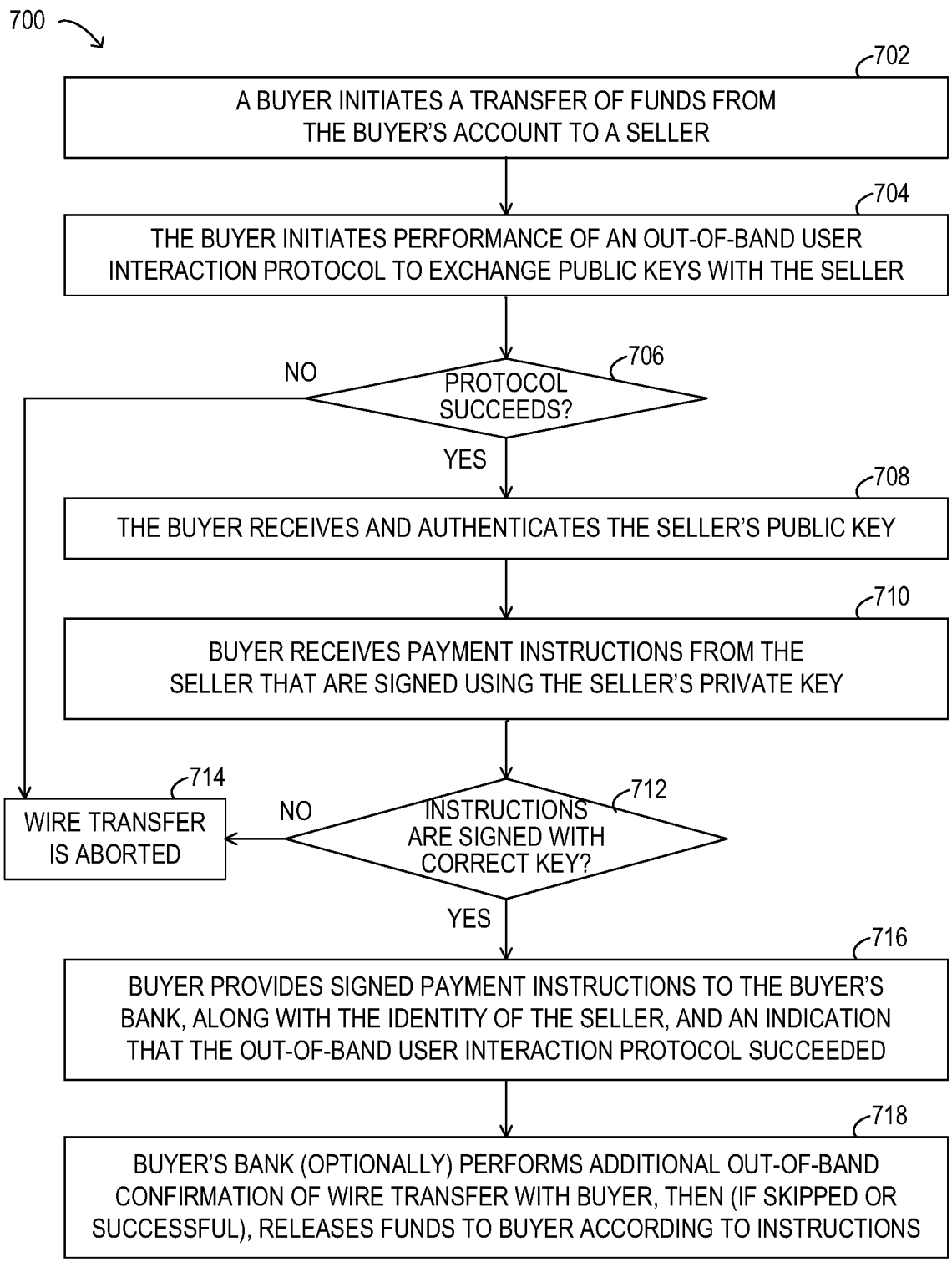
FIG. 7A is flow diagram illustrating selected elements of a method for authenticating payment instructions for a wire transfer using an out-of-band user interaction protocol, according to one embodiment.

FIG. 7A is flow diagram illustrating selected elements of a method 700 for authenticating payment instructions for a wire transfer using an out-of-band user interaction protocol, according to one embodiment. In various embodiments, operations of method 700 may be performed by one or more authentication agents executing on the computing devices of the two parties to the secure transaction and/or by one or more authentication agents executing on a computing device of a third party to the secure wire transfer, such as computing device of the buyer's bank or of an authentication service. Method 700 may be performed once or repeatedly to authenticate parties to respective wire transfers and/or payment instructions. It is noted that certain operations described in method 700 may be optional or may be rearranged in different embodiments.

As illustrated in FIG. 7A, method 700 may include, at 702, a buyer initiating a transfer of funds from the buyer's account to a seller. In some embodiments, the transfer of funds may be initiated using a banking application executing on the buyer's smart phone, or by accessing the bank's website through a web browser, for example. In at least some embodiments, a request to initiate a wire transfer (or another type of secure transaction) may specify whether a video memo, video memo chain, voice memo, or voice memo chain is required to authenticate a given party to the transaction and/or the information received from a given party to the transaction prior to allowing the wire transfer (or other secure transaction) to proceed.

At 704, the method may include the buyer, though their computing device, initiating the performance of an out-of-band user interaction protocol to exchange public keys with the seller, as described herein. In one example, performing the out-of-band user interaction protocol may include the seller reading a sequence of security words and the buyer acknowledging, through a user interface on the buyer's computing device, that the correct sequence of security words was read by the seller.

If, at 706, it is determined that the out-of-band user interaction protocol succeeds, method 700 may continue at 708. Otherwise, the method may proceed to 714. At 708, method 700 may include the buyer's computing device receiving and authenticating the seller's public key.

At 710, the method may include the buyer receiving, at their computing device, payment instructions from the seller that are signed using the seller's private key. If, at 712, it is determined, by the buyer's computing device, that the instructions are signed with the correct key, method 700 may continue at 716. Otherwise, the method may proceed to 714.

At 714, the method may include aborting the wire transfer and, in some embodiments, sending an indication of the failure of the wire transfer from the buyer's computing device to the seller's computing device and/or to a computing device at the buyer's bank (e.g., to prevent the funds from being released).

At 716, method 700 may include the buyer's computing device providing the signed payment instructions to the computing device at the buyer's bank, along with the identity of the seller, and an indication that the out-of-band user interaction protocol succeeded.

At 718, the method may include a computing device at the buyer's bank (optionally) initiating the performance of an additional out-of-band confirmation of the wire transfer with buyer, after which (assuming this confirmation is successful or if it is skipped), the computing device at the buyer's bank may releases funds to the seller, in accordance with the authenticated payment instructions.

Figure 7B:
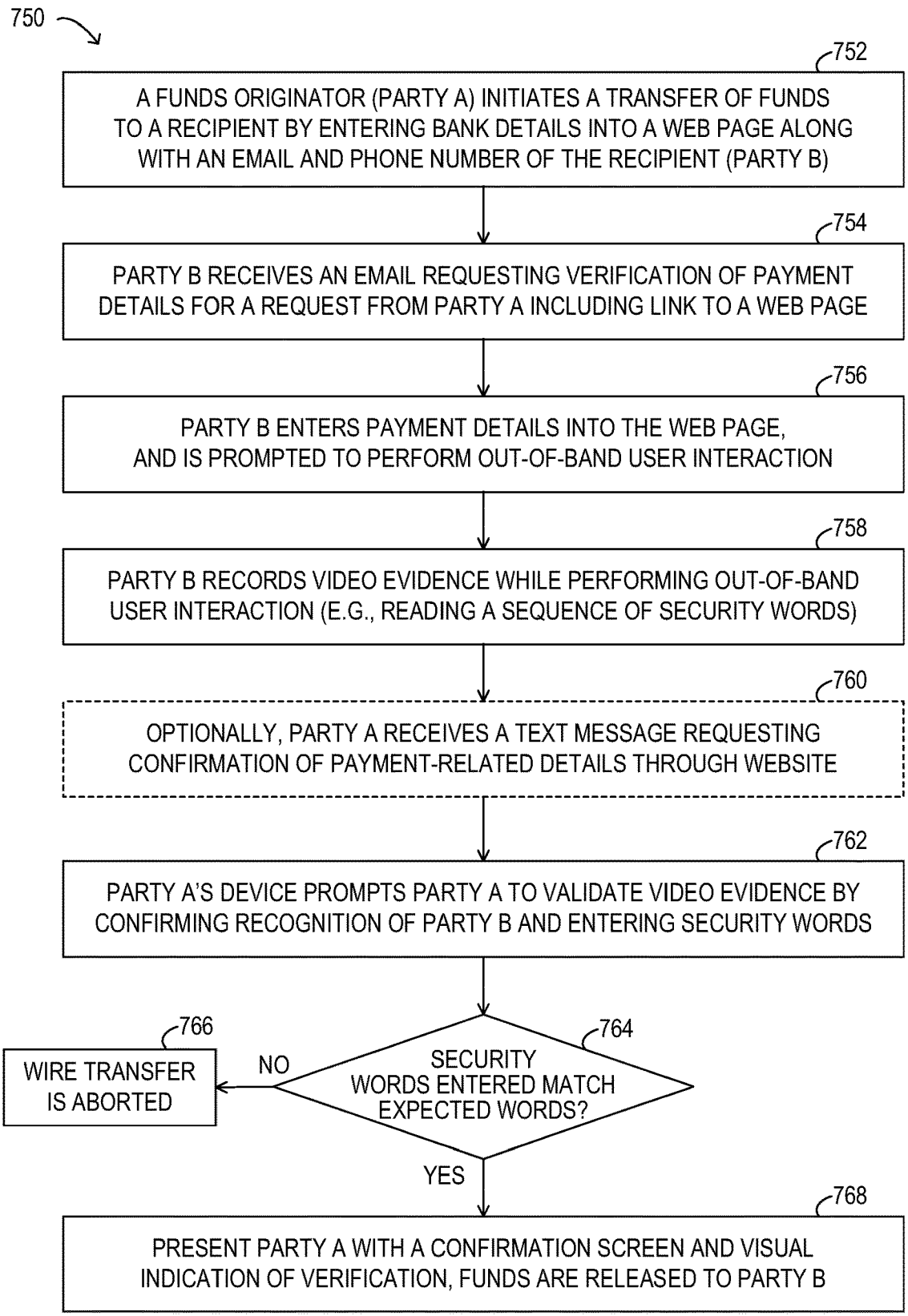
FIG. 7B is flow diagram illustrating selected elements of a method for authenticating payment instructions for a wire transfer using an out-of-band user interaction protocol, according to another embodiment.

FIG. 7B is flow diagram illustrating selected elements of a method 750 for authenticating payment instructions for a wire transfer using an out-of-band user interaction protocol, according to another embodiment. In various embodiments, operations of method 750 may be performed by one or more authentication agents executing on the computing devices of the two parties to the secure transaction and/or by one or more authentication agents executing on a computing device of a third party to the secure wire transfer, such as a computing device of the buyer's bank or of an authentication service. Method 750 may be performed once or repeatedly to authenticate parties to respective wire transfers and/or payment instructions. It is noted that certain operations described in method 750 may be optional or may be rearranged in different embodiments.

As illustrated in FIG. 7B, method 750 may include, at 752, a funds originator (referred to as party A) initiating a transfer of funds to a funds recipient (referred to as party B) by entering bank details into a web page (e.g., a web page associated with the buyer's bank or with a third-party authentication service) along with an email and phone number of the recipient (party B).

At 754, method 750 may include party B receiving an email from the buyer's bank or the third-party authentication service requesting verification of payment instructions for a wire transfer request from party A, including a link to a web page through which party B can enter, review, or verify payment-related details for the wire transfer.

At 756, the method may include party B entering payment-related details into the web page, after which party B may be prompted, by an authentication agent executing on a computing device of the buyer's bank or the third-party authentication service, to perform an out-of-band user interaction, such as those described herein. In one example, party B may enter the payment-related details by taking and uploading a photo of a cancelled check. In another example, party B may enter routing and account numbers into a text-based user interface on the web page.

At 758, method 700 may include party B recording video evidence while performing the out-of-band user interaction. The out-of-band user interaction may include, e.g., party B reading a sequence of security words, after which party A acknowledges, through a user interface on party A's computing device, that the correct sequence of security words was read by party B.

At 760, the method may, optionally, include party A receiving a text message from a computing device of the buyer's bank or the third-party authentication service requesting confirmation of the payment-related details through the web page. For example, the text message may prompt party A to go to a web page associated with the buyer's bank or the third-party authentication service and enter the last four digits of the bank account number supplied at 756 or a meaningless nonce extracted or derived from the information that was entered at 756.

At 762, method 750 may include party A's computing device (or an authentication agent executing thereon) prompting party A to validate the video evidence by confirming their recognition of party B and entering the security words spoken by party B, as observed in the video, into a user interface on their computing device.

If, at 764, it is determined that the security words entered by party A match those that were expected to be spoken by party B, method 750 may continue at 768. Otherwise, the method may proceed to 766.

At 766, the method may include aborting the wire transfer and, in some embodiments, sending an indication of the failure of the wire transfer from party A's computing device to party B's computing device and/or to the computing device at the buyer's bank or third-party authentication service (e.g., to prevent the funds from being released).

At 768, method 750 may include the computing device of the buyer's bank or the third-party authentication service presenting party A with confirmation screen displaying payment-related details and a visual indication of the verification of the payment details, after which, assuming party A confirms the wire transfer (e.g., through a user interface on the confirmation screen), the requested funds are released to party B in accordance with the authenticated payment instructions.

In one embodiment of method 750, party B may record a voice memo rather than a video memo, to communicate the security words. In another embodiment, party A may have a driver's license for party B in a database and this may be shown to party A next to the video memo. In some embodiments, party A may perform some or all of the protocol steps on a web browser. In some embodiments, party B may perform some or all of the protocol steps using an application executing on a mobile phone.

Note that not all of these example use cases necessarily involve an exchange of public keys. However, all of them rely on an out-of-band user interaction that is used to associate entered data to a particular person.

In some embodiments, if party B is interacting with a web-based application, in order to avoid "man-in-the-browser" attacks, the methods described above may include obtaining an "action authentication" from party B. Specifically, party B may receive a text message from a third party (e.g., a back or a third-party authentication service) on their mobile device directing party B to a web site, where party B is then "tested" or "quizzed" (e.g., told to enter last four digits of their bank account number.) This operation may ensure that the bank details that the server received belong to the entity holding party B's mobile device (as opposed to a fraudster, who might have modified bank details from "within" the browser). In some embodiments, before completing a wire transfer or other secure transaction, a third party (e.g., a bank or a third-party authentication service)

may (at the request of an originating party) perform an identity check of a receiving party. For example, a computing device of the third party may send a text message directing the receiving party to a web site, where they are prompted to select identifying information (e.g., a street on which they previously lived, a state in which they lived during a specified year, and/or a credit card account that they hold) from multiple options. If and only if the receiving party correctly answers the questions, the wire transfer or other secure transaction may be allowed to proceed. In some embodiments, an identity check performed by a third party (e.g., a bank or a third-party authentication service) and directed to a given party of a wire transfer or other secure transaction may include a search of one or more private or publicly accessible databases to identify any anomalies in the use of the given party's phone or in their location history.

The authentication techniques described herein may be instantiated to support a wide variety of applications beyond the wire transfer protocols illustrated in FIGS. 7A and 7B. In some embodiments, the disclosed techniques for performing authentication using an out-of-band user interaction may be instantiated to support the pre-authentication of persons who might, at a later time, be parties to various secure transactions managed by a third party (e.g., a bank or third-party authentication service), such as a new payee or a new member of an organization whose members may, from time to time, exchange secure documents. In some embodiments, the disclosed techniques may be instantiated to support authentication for a secure document transfer or an invoice authentication. For example, in order to transmit documents securely, a relatively simple protocol may be used to transmit, via an authenticated channel, the password for a secure document that is sent via e-mail. Even though e-mail itself is not completely secure, the document password may be sent via the authenticated channel with assurances. Another example method for securely transferring encrypted documents is illustrated in FIG. 8 and described below.

Figure 8:
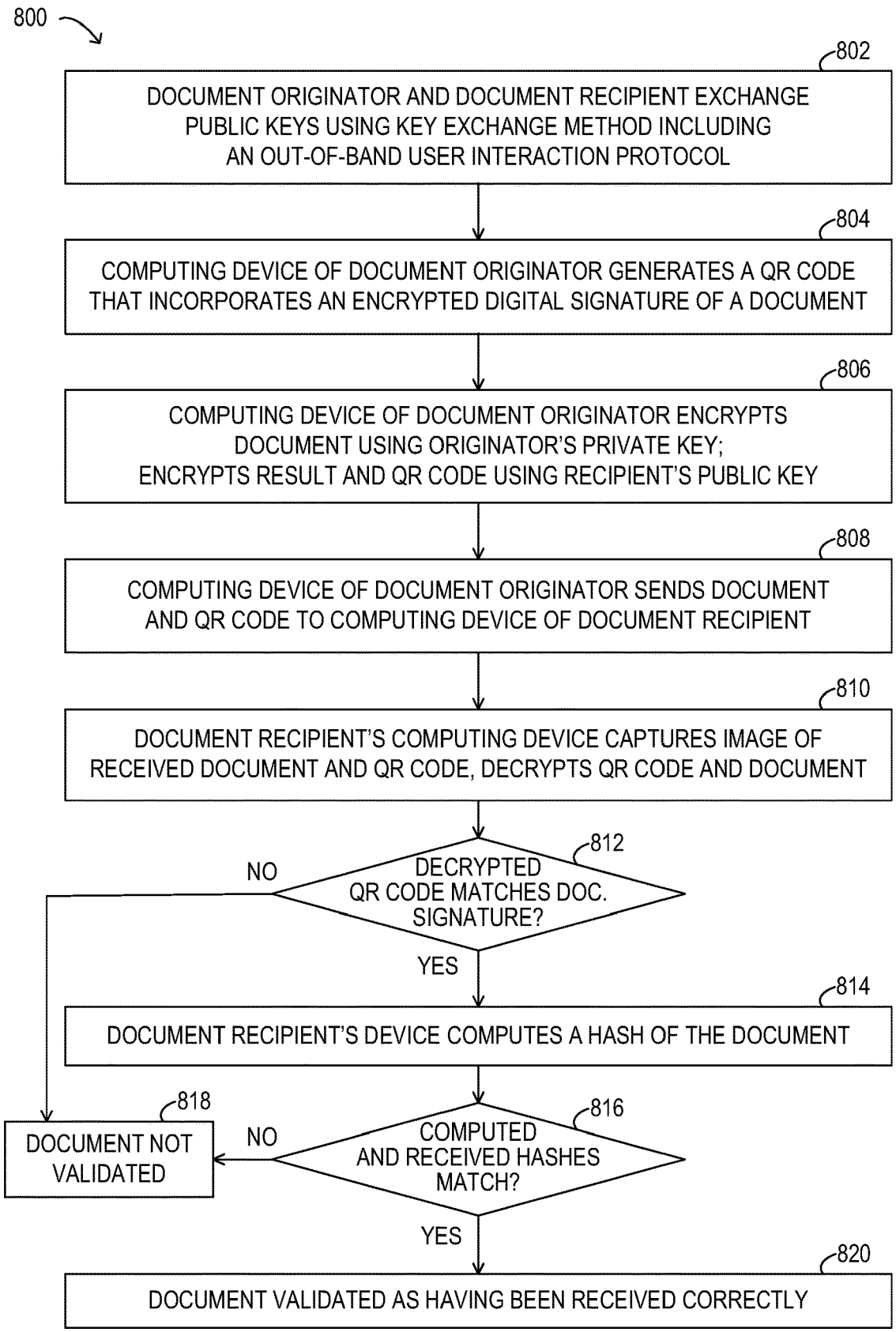
FIG. 8 is flow diagram illustrating selected elements of a method for securely transferring encrypted documents using an out-of-band user interaction protocol, according to one embodiment.

FIG. 8 is flow diagram illustrating selected elements of a method 800 for securely transferring encrypted documents using an out-of-band user interaction protocol, according to one embodiment. In various embodiments, operations of method 800 may be performed by one or more authentication agents executing on the computing devices of the two parties to a secure document transfer and/or by one or more authentication agents executing on a computing device of a third party to the secure document transfer, such as computing device of a third-party authentication service. Method 800 may be performed once or repeatedly to authenticate parties to respective document transfers. It is noted that certain operations described in method 800 may be optional or may be rearranged in different embodiments.

As illustrated in FIG. 8, method 800 may include, at 802, a document originator and a document recipient exchanging public keys using key exchange method including an out-of-band user interaction protocol, as described herein. The document originator may be the creator of the document or a distributor of the document, in different embodiments.

At 804, method 800 may include a computing device of the document originator generating a barcode or a matrix type two-dimensional barcode (such as a Quick Response Code, or QR code®, the trademark of which is assigned to Denso Wave Incorporated) that incorporates an encrypted digital signature of a document. For example, the computing device of the document originator (or an authentication agent executing thereon) may compute a QR code for an encrypted signed hash of the document.

At 806, the method may include the computing device of the document originator (or an authentication agent executing thereon) encrypting the document using the document originator's private key, then encrypting that result and the QR code using recipient's public key. In other words, method 800 may include computing a hash of the document, signing the hash of document with the originator's private key, and then encrypting the signed hash with the recipient's public key.

At 808, method 800 may include the computing device of document originator (or an authentication agent executing thereon) sending the document and the QR code to the computing device of the document recipient (e.g., using email).

At 810, the method may include the document recipient's computing device capturing an image of the received document and QR code, and decrypting the QR code and the document.

If, at 812, it is determined that the decrypted QR code matches the document signature, method 800 may continue at 814. Otherwise, the method may proceed to 818. At 814, the method may include the document recipient's computing device computing a hash of the document.

If, at 816, it is determined that the computed and received hashes match, method 800 may continue at 820. Otherwise, the method may proceed to 818. At 818, the document is not validated and the method may include the document recipient's computing device sending an indication of failure to the document originator. At 820, the document is validated as having been received correctly, and the method may include the document recipient's computing device sending an indication of success to the document originator.

In another example embodiment, a document originator may generate a password for a document, may encrypt the password using the document recipient's public key, and may send the encrypted document and the encrypted password to the document recipient. The document recipient may receive the encrypted password and the encrypted document, may decrypt the password and may display the decrypted password for use in opening the encrypted document.

In some embodiments, the authentication techniques described herein may be applied to authenticating approvals. For example, an administrator may establish authenticated channels with potential approvers of various classes of decisions using the out-of-band user interaction protocols described herein. Subsequently, when a form needs to be circulated in order to authorize a decision, the administrator may use an application to send respective push notifications to each approver in sequence over the established channels, asking them to push a button to either approve or deny the request. In some embodiments, the push notifications sent to each approver may include all or a portion of a transcript, including any public keys that were exchanged, any collection of tokens communicated and acknowledged, any messages transmitted between the parties to the approval process (e.g., between two approvers and/or between the approvers and a third-party authentication service), the approval or denial of the request submitted by previous approvers in the sequence, and/or video or audio evidence of an out-of-band user interaction, at least some of which may be presented to the next approver in the sequence. This approach may be used for authorizing a wide variety of decisions or actions, in different embodiments.

In systems in which the creation of a user-account (e.g., a registration) involves an asymmetric interaction as described above, a user may, from time to time, need to recover their account for some reason.

Figure 9:
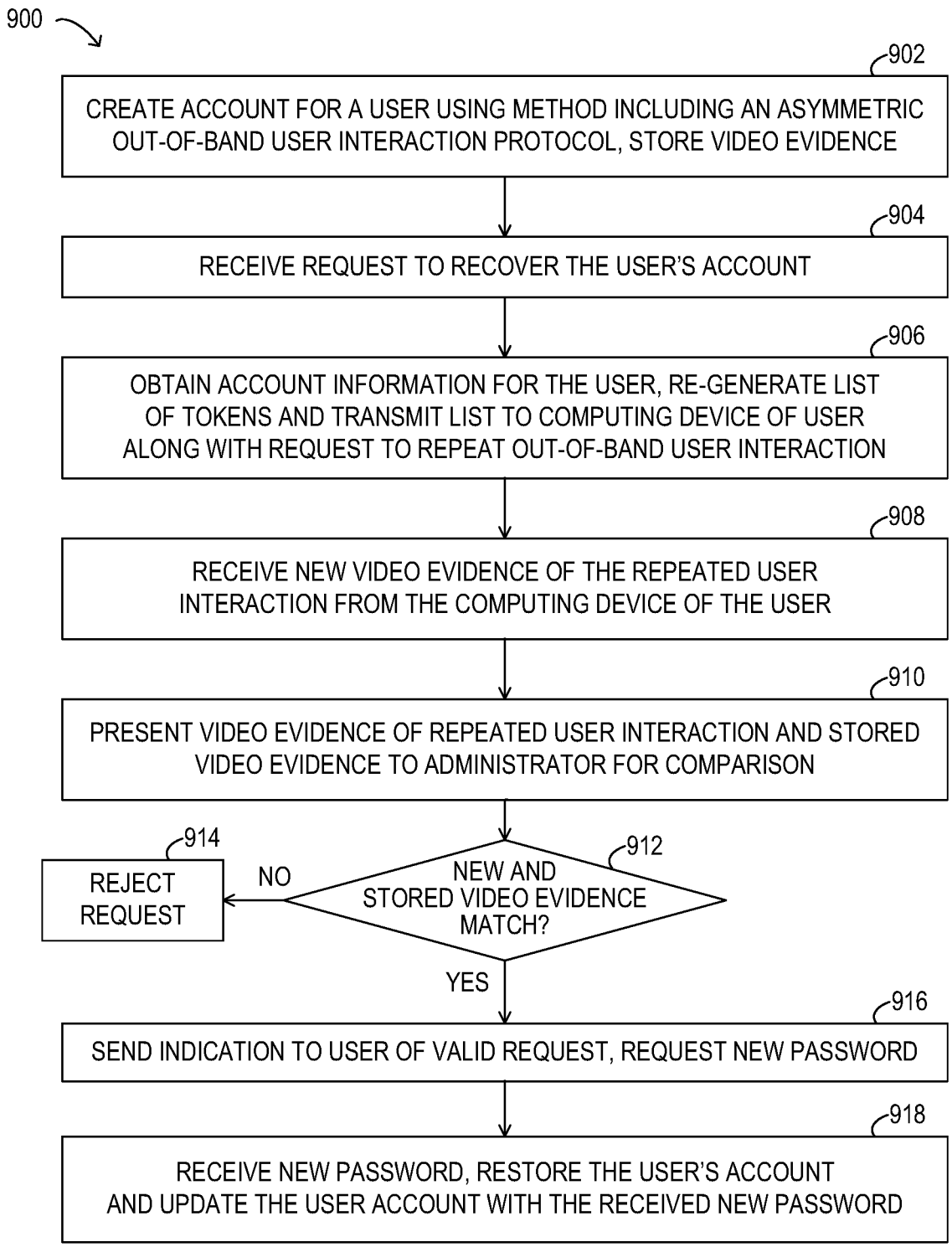
FIG. 9 is flow diagram illustrating selected elements of a method for creating and recovering a user's account using an out-of-band user interaction protocol, according to one embodiment.

FIG. 9 is flow diagram illustrating selected elements of a method 900 for creating and recovering a user's account using an out-of-band user interaction protocol, according to one embodiment. In various embodiments, operations of method 900 may be performed by one or more authentication agents executing on the user's computing device and/or by one or more authentication agents executing on a computing device of an administrator of the user's account or of a third-party authentication service. Method 900 may be performed once or repeatedly to create and recover user accounts on behalf of respective users. It is noted that certain operations described in method 900 may be optional or may be rearranged in different embodiments.

As illustrated in FIG. 9, method 900 may include, at 902, creating (e.g., through a web server for a company or service that includes registered users) an account for a user using a method that includes an asymmetric out-of-band user interaction protocol, as described herein. The method may also include storing the video evidence created during performance of the out-of-band user interaction.

At 904, the method may include receiving, by a computing device of the company or service with which the user is registered or by a third-party authentication service, a request to recover the user's account. At 906, method 900 may include, in response to receiving the request to recover the user's account, obtaining account information for the user, re-generating a list of tokens used in performing the out-of-band user interaction, and transmitting the list of tokens to a computing device of the user along with a request prompting the user to repeat the out-of-band user interaction.

At 908, method 900 may include receiving, by the computing device of the company or service with which the user is registered or by the third-party authentication service, new video evidence of the repeated out-of-band user interaction from the computing device of the user. At 910, the method may include presenting the new video evidence of the repeated out-of-band user interaction and the stored video evidence to an administrator of the company or service with which the user is registered or of the third-party authentication service for comparison. In some embodiments, the administrator who performs the comparison may input (e.g., through a user interface of an authentication agent executing on the computing device on which the new and stored video evidence was displayed) a result of the comparison. In other embodiments, the comparison of the new and stored video evidence may be performed automatically, e.g., by the computing device of the company or service with which the user is registered or by the third-party authentication service, rather than by a human administrator.

If, at 912, it is determined that the new video evidence and the stored video evidence match, in terms of the performance of the out-of-band user interaction, method 900 may continue at 916. Otherwise, the method may proceed to 914. At 914, the method may include the computing device of the company or service with which the user is registered or the third-party authentication service rejecting the request to recover the user's account and, in some embodiments, sending an indication of the rejection to the user, the user's computing device, and/or to another computing device or party from whom the request was received on behalf of the user, if applicable.

At 916, method 900 may include the computing device of the company or service with which the user is registered or the third-party authentication service sending an indication to the user that the request to recover the user's account has been validated and requesting a new password for the user's account. At 918, the method may include the computing device of the company or service with which the user is registered or the third-party authentication service receiving new password from a computing device of the user and, in response, restoring the user's account, and updating the user account with the new password.

In some embodiments, the authentication techniques described herein may be instantiated to support the use of phone-based encryption keys. For example, there may be a variety of ways to ensure that keys exchanged as part of the out-of-band user interaction protocols described above (and proof that the protocols were correctly executed) remain valid even when a phone is lost or replaced. In the case of a phone upgrade, for example, authentication-related information such as keys and transcripts of out-of-band user interactions may be sent via a transfer from the old phone to the new phone (via a proximity network such as a Bluetooth™ network). In either case, the user may choose to escrow authentication-related information a server of a third-party authentication service, encrypted with a chosen temporary password. In one example, a user may use any suitable "secret-sharing" protocol to electronically store authentication-related information with a small number of trusted associates. In the event that the user's phone is lost, the user may recover the authentication-related information by obtaining a sufficient number of secret pieces from the trusted associates. These secrets may be be transferred either by e-mail, via a phone proximity network, or using a higher security communication mechanism, in different embodiments.

In some embodiments, the authentication techniques described herein may be instantiated to support Website registration, password-less login and/or account recovery. For example, the asymmetric interaction previously described may support the following secure interactions with a website:

(a) Account setup and/or registration: In this example, the user may engage in an asymmetric out-of-band user interaction as described above, associating a key with a video which is stored at the website.

(b) Authentication: In this example, to log into the website, an application (such as an authorization agent) may authenticate using the key stored at the website, either in concert with a password on the website, or password-less. Depending on security requirements or other criteria (e.g., detection of unusual access pattern), the site may require the user to upload another video to be matched against the original one.

(c) Recovery: In this example, a user may engage in an account recovery interaction as described above. A new video may be generated and bound to a new key that replaces the previously stored one.

Figure 10:
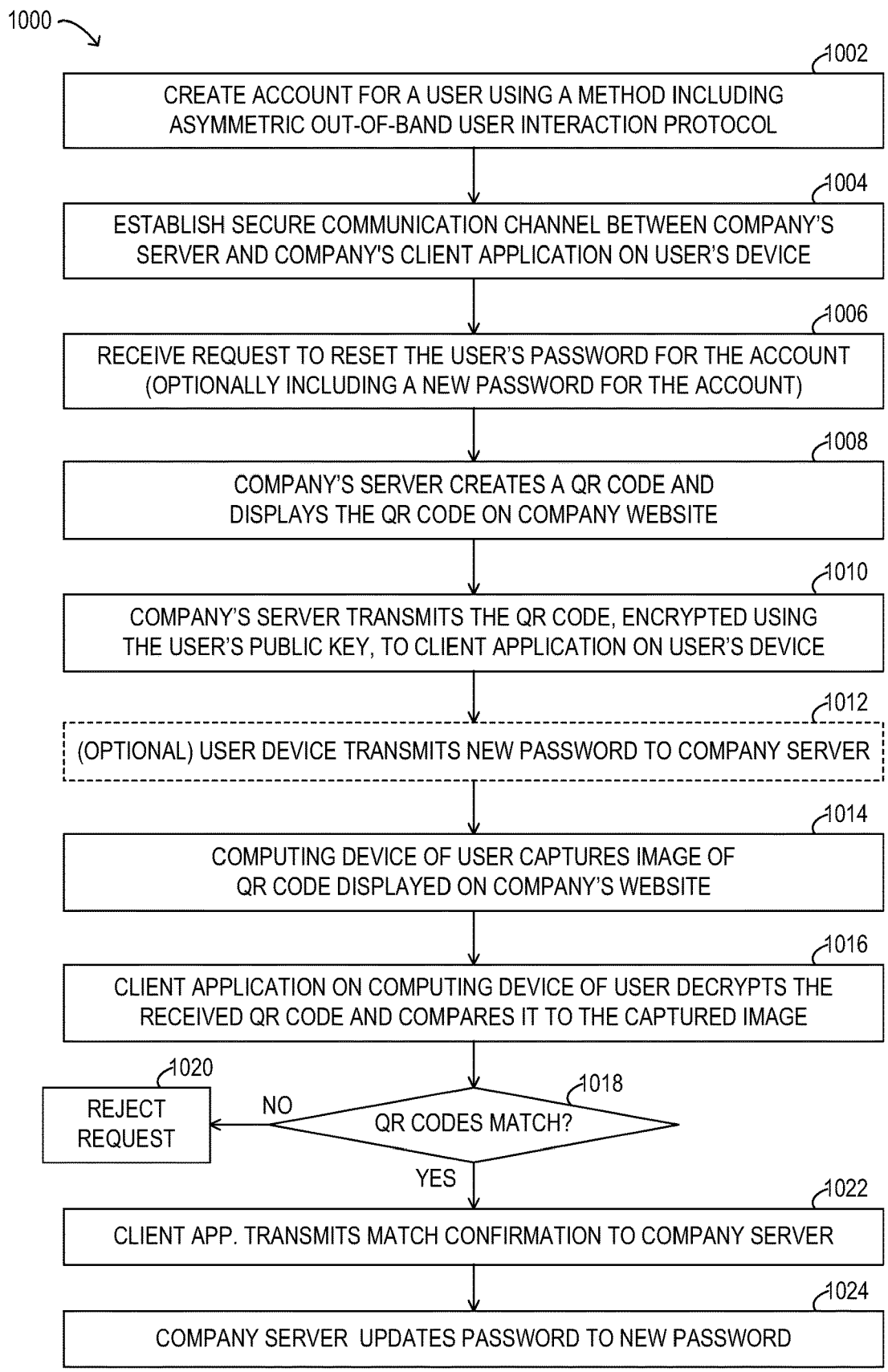
FIG. 10 is flow diagram illustrating selected elements of an embodiment of a method for creating a user account using an asymmetric out-of-band user interaction protocol and subsequently resetting the user's password.

(d) Application-assisted password reset. This example embodiment is illustrated in FIG. 10 and described below. In this example, a user A has asymmetrically created a secure channel with company X on an application executing on user A's mobile device. User A also has an account on company X's website.

FIG. 10 is flow diagram illustrating selected elements of an embodiment of a method 1000 for creating a user account using an asymmetric out-of-band user interaction protocol and subsequently resetting the user's password. In various embodiments, operations of method 1000 may be performed by one or more authentication agents executing on the user's computing device and/or by one or more authentication agents executing on a computing device of an administrator of user accounts for a company or service or of a third-party authentication service. Method 1000 may be performed once or repeatedly to create user accounts and reset user passwords on behalf of respective users. It is noted that certain operations described in method 1000 may be optional or may be rearranged in different embodiments.

As illustrated in FIG. 10, method 1000 may include, at 1002, creating, by a computing device of the company or service that has registered users or of a third-party authentication service, an account for a user using a method that includes an asymmetric out-of-band user interaction protocol, as described herein. In various embodiments, the account may be created by an authentication agent executing on a computing device of an administrator of user accounts for the company or service or on a computing device of a third-party authentication service in response to receiving a request for a user account (e.g., at a web page or web server for the company or service).

At 1004, method 1000 may include, in response to successful completion of the asymmetric out-of-band user interaction protocol, establishing a secure communication channel between a company's server and a client application for the company executing on the user's computing device (e.g., a company-specific smartphone application or a client application for a third-party authentication service).

At 1006, the method may include receiving, by a computing device of the company or service or by a third-party authentication service, a request to reset the user's password for the account. In some embodiments, the request may (optionally) include a new password for the account. In other embodiments, a new password may be received at a later point in the password reset process and/or in a separate request.

At 1008, method 1000 may include, in response to the request, the company's server (or an authentication agent executing thereon) creating a QR code for the password reset process and displaying the QR code on the company website.

At 1010, the method may include the company's server transmitting the QR code, encrypted using the user's public key, to the client application on the user's computing device. At 1012, the method may (optionally) include the user's computing device transmitting a new password to the company server, if a new password has not already been transmitted by the user (e.g., at 1006).

At 1014, method 1000 may include the computing device of the user capturing an image of the QR code displayed on company's website. At 1016, the method may include the client application on the user's computing device decrypting the received QR code and comparing it to the captured image.

If, at 1018, it is determined that the displayed and decrypted QR codes match, method 1000 may continue at 1022. Otherwise, the method may proceed to 1020.

At 1020, the method may include rejecting the password reset request and, in some cases, sending an indication of the rejection to the user, the user's computing device, and/or to another computing device or party from whom the request was received on behalf of the user, if applicable.

At 1022, method 1000 may include the client application executing on the user's computing device transmitting a confirmation of the match to the company server. At 1024, the method may include the company server (or an authentication agent thereof) updating the user's password to the new password.

Note that, in the example use case illustrated in FIG. 10, the QR code may be used to establish the identity of the browser session. Simply using two-factor authentication in this case may be susceptible to timing attacks in which the attacker logs in simultaneously with the user and asks for a password reset.

Figure 11:
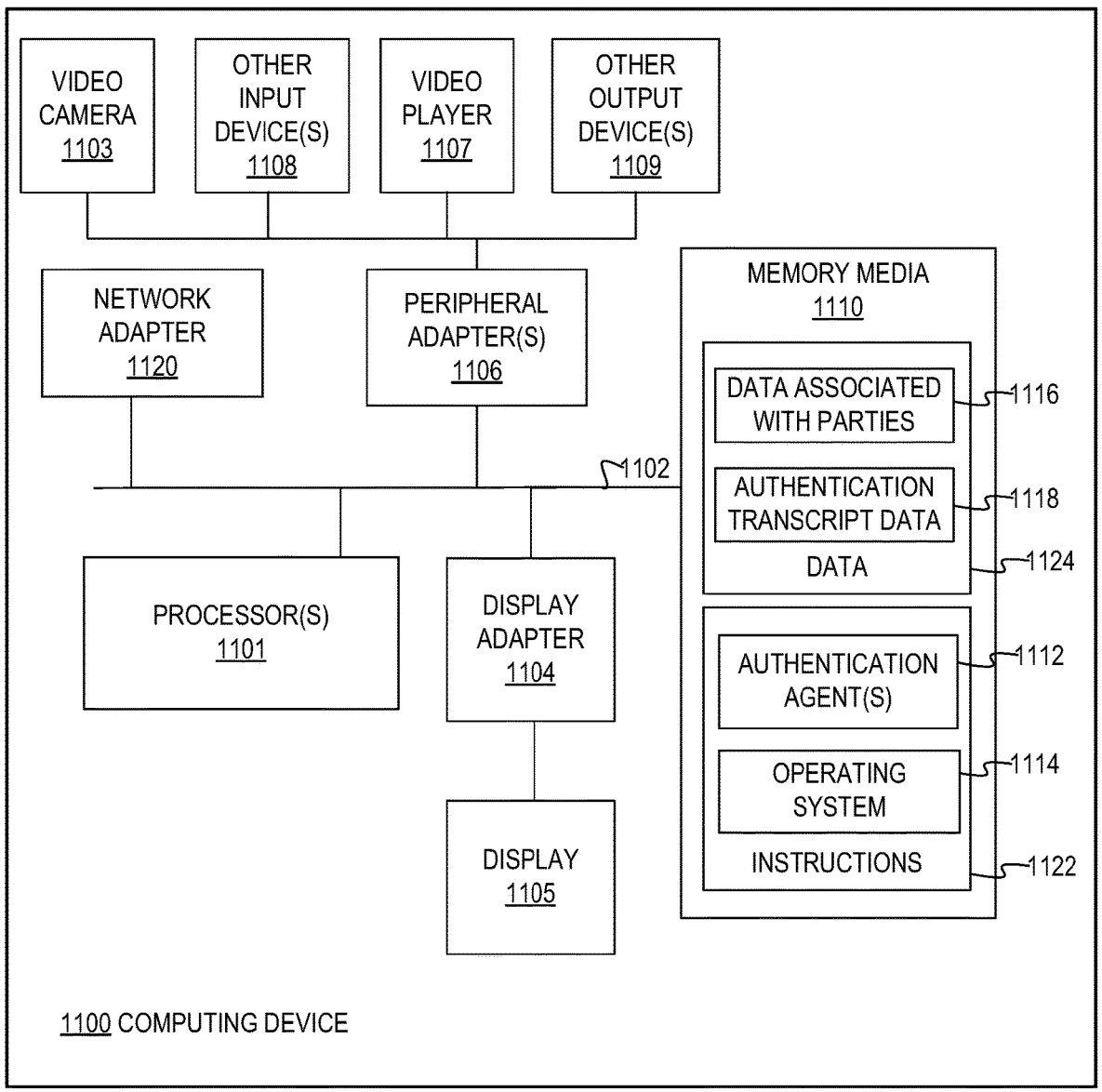
FIG. 11 is a block diagram illustrating selected elements of an embodiment of a computing device for performing any of the methods described herein for authentication with an out-of-band user interaction.

FIG. 11 is a block diagram illustrating selected elements of an embodiment of a computing device 1100 for performing any of the methods described herein for authentication with an out-of-band user interaction. For example, computing device 1100 may represent a computing device of any party to a secure transaction (including, but not limited to, an exchange of secure documents or other information, a transfer of funds, the registration, validation, or recovery of an account, or the resetting of a password) or a computing device of a third party to a transaction (including, but not limited to, a bank, a company or service that has registered users and/or user accounts, or a third-party authentication service). Computing device 1100 may be a mainframe computer, a desktop computer, or a portable computing device, such as a notebook computer, media player, personal data assistant, digital camera, cellular phone, smart phone, or tablet computer. In the embodiment depicted in FIG. 11, computing device 1100 includes one or more processors 1101 coupled via shared bus 1102 to processor accessible storage media collectively identified as memory media 1110.

Computing device 1100, as depicted in FIG. 11, further includes network adapter 1120 that interfaces computing device 1100 to a network (not shown in FIG. 11). Computing device 1100, as depicted in FIG. 11, may include one or more peripheral adapters 1106, each of which may provide connectivity for the use of video camera 1103, other input devices 1108 (e.g., a voice recorder), video player 1107, and/or other output devices 1109 (e.g., one or more speakers). Input devices 1108 may represent any of various devices for user input, such as a keyboard or a mouse. Output devices 1109 may represent any of various devices for providing signals or indications to a user, such as loudspeakers for generating audio signals. Video player 1107 and/or video camera 1103 might or might not be coupled to or integrated with display 1105, in different embodiments. In some embodiments, one of peripheral adapters 1106 may include a video camera interface or driver, or a driver for another type of input/output device, including a driver for a voice recorder or one or more GUI drivers for capturing inputs from users.

Computing device 1100 is shown in FIG. 11 including display adapter 1104 and further includes a display device or, more simply, a display 1105. Display adapter 1104 may interface shared bus 1102, or another bus, with an output port for one or more displays, such as display 1105. Display 1105 may comply with a display standard for computer monitors and/or television displays. Standards for computer monitors include analog standards such as video graphics array (VGA), extended graphics array (XGA), etc., or digital standards such as digital visual interface (DVI) and high definition multimedia interface (HDMI), among others. A television display may comply with standards such as National Television System Committee (NTSC), Phase Alternating Line (PAL), or another suitable standard. Display 1105 may include an output device 1109, such as one or more integrated speakers to play audio content, or may include an input device 1108, such as a microphone, voice recorder, or video camera.

Memory media 1110 may encompass persistent and volatile media, fixed and removable media, and magnetic and semiconductor media. Memory media 1110 is operable to store instructions, data, or both. Memory media 1110 is shown storing instructions 1122, which may represent one or more sets of instructions and data structures embodying or utilized by any one or more of the methods and/or operations described herein. It is noted that instructions 1122 may also reside, completely or at least partially, within processor 1101 during execution thereof by computing device 1100 (not shown in FIG. 11). It is further noted that processor 1101 may be configured to receive instructions 1122 from memory media 1110 via shared bus 1102. Memory media 1110 as shown includes sets or sequences of instructions 1122, namely, operating system 1114, and one or more authentication agents 1112, which may perform any of the methods described herein for authentication with an out-of-band user interaction. For example, in various embodiments, authentication agents 1112 may include a key generator, a security word generator, a message constructor, and/or other authentication agents configured to perform operations of the methods described herein.

Memory media 1110 is also shown storing data 1124, including data associated with parties to secure transactions (1116) and authentication transcription data (1118). In various embodiments, data 1116 may include one or more tables mapping usernames of parties to secure transactions with device identifiers (e.g., phone numbers, UUIDs, or IP addresses), one or more tables mapping device identifiers (e.g., phone numbers, UUIDs, or IP addresses) to application identifiers (e.g., identifiers of particular application instances), and/or a registry of authenticated parties (which may include information about their authenticated encryption keys). In some embodiments, authentication transcript data 1118 may include video and/or audio evidence created during the performance of out-of-band user interactions (e.g., video memos, video transcripts, voice memos, or audio transcripts), messages exchanged between the parties to various secure transactions or between the parties to a secure transaction and a third party (e.g., a bank or a third-party authentication service) during authentication exercises, any encryption keys exchanged during authentication exercises, lists of tokens shared between parties to a transaction, sequences of communicated and/or acknowledged tokens, and/or any other data descriptive of particular out-of-band user interactions.

The methods and systems disclosed herein for establishing authenticated, encrypted channels between two parties to a secure transaction may include the performance of an out-of-band user interaction in which the ability of humans to implicitly authenticate each other is leveraged to determine whether information exchanged between two parties is received from the correct party, rather than from an imposter. When the out-of-band user interaction between two parties completes successfully, each participant receives assurances that messages exchanged through the established channel were actually were sent by the other party. In various embodiments, the out-of-band user interaction protocol may rely on video or audio evidence that one or both parties to a secure transaction have performed particular actions in accordance with the out-of-band user interaction protocol and particular cryptographic methods. In some embodiments, the authentication techniques described herein may be provided as an application programming interface (API) to a third-party service for general-purpose single- or multi-user authorization and/or decision-making. For example, business logic may query a server of a third-party authentication service via the API. The server of the third-party authentication service may, in turn, query service subscribers (users) via an application (e.g., an authentication agent) executing on the user's computing devices (e.g., phones or other mobile devices).

The above disclosed subject matter is to be considered illustrative, and not restrictive, and the appended claims are intended to cover all such modifications, enhancements, and other embodiments which fall within the true spirit and scope of the present disclosure. Thus, to the maximum extent allowed by law, the scope of the present disclosure is to be determined by the broadest permissible interpretation of the following claims and their equivalents, and shall not be restricted or limited by the foregoing detailed description.

What is claimed is:

1. A method for authenticating a party to a secure transaction, comprising:
   receiving, at a second computing device, an out-of-band user interaction protocol;
   receiving, from a first computing device on behalf of a first party at the second computing device of a second party, first information associated with a secure transaction between the first party and the second party;
   receiving, from the first computing device at the second computing device, first video or audio evidence of one or more actions taken by the first party;
   capturing, by the second computing device during presentation of the first video or audio evidence by the second computing device, acknowledgement of the one or more actions taken by the first party as observed or heard by the second party in the first video or audio evidence;
   determining, by the second computing device dependent on the captured acknowledgement, whether or not the one or more actions observed or heard by the second party match actions expected to have been taken by the first party in accordance with the out-of-band user interaction protocol; and
   determining, by the second computing device dependent on whether or not the one or more actions observed or heard by the second party match the actions expected to have been taken by the first party in accordance with the out-of-band user interaction protocol, whether to accept the first information associated with the secure transaction.

2. The method of claim 1, wherein:
   the first information is a public key of a public-private key pair created on behalf of the first party for potential use when exchanging information between the first party and the second party; and
   the method further comprises:
   accepting, by the second computing device in response to determining that the one or more actions observed or heard by the second party match the actions expected to have been taken by the first party in accordance with the out-of-band user interaction protocol, the public key;
   receiving, from the first computing device, second information associated with the secure transaction; and
   using, by the second computing device, the public key to decrypt the second information.

3. The method of claim 1, wherein:
   the first information comprises an identifier of the first party; and
   the method further comprises:
   authenticating, by the second computing device in response to determining that the one or more actions observed or heard by the second party match the actions expected to have been taken by the first party in accordance with the out-of-band user interaction protocol, the identifier of the first party; and subsequent to authenticating the identifier of the first party, allowing the secure transaction between the first party and the second party to proceed.

4. The method of claim 1, wherein:

the secure transaction comprises a transfer of funds from the second party to the first party; and the first information comprises payment instructions received from the first computing device on behalf of the first party.

5. The method of claim 1, wherein:

the first computing device comprises a server of third party to the secure transaction;

the first information is received from the server on behalf of the first party; and the first video or audio evidence is received from the server on behalf of the first party.

6. The method of claim 1, wherein:

the actions expected to have been taken by the first party in accordance with the out-of-band user interaction protocol comprise:

communicating, in response to prompting by the first computing device, a sequence of tokens generated by the first computing device in accordance with the out-of-band user interaction protocol; and recording the communicating using a video camera or voice recorder;

the first video or audio evidence is based on the recording; and capturing acknowledgement of the one or more actions taken by the first party comprises:

receiving, through a user interface of the second computing device, input identifying the sequence of tokens communicated by the first party as observed or heard by the second party in the first video or audio evidence.

7. The method of claim 1, further comprising, in response to determining that the one or more actions observed or heard by the second party match the actions expected to have been taken by the first party in accordance with the out-of-band user interaction protocol:

recording, by the second computing device, second video or audio evidence of one or more actions taken by the second party in accordance with the out-of-band user interaction protocol;

providing, to the first computing device, the second video or audio evidence of the one or more actions taken by the second party; and receiving, from the first computing device, an indication of whether or not actions observed or heard by the first party in the second video or audio evidence match actions expected to have been taken by the second party in accordance with the out-of-band user interaction protocol.

8. The method of claim 1, further comprising:

refraining from performing the secure transaction between the first party and the second party in response to determining that the one or more actions observed or heard by the second party do not match the actions expected to have been taken by the first party in accordance with the out-of-band user interaction protocol.

9. The method of claim 1, wherein the first video or audio evidence received from the first device comprises a video stream transmitted to the second device during performance of the one or more actions by the first party, a video memo recorded during performance of the one or more actions by the first party, an audio stream transmitted to the second device during performance of the one or more actions by the first party, or an audio memo recorded during performance of the one or more actions by the first party.

10. A non-transitory computer readable memory media storing instructions executable by a processor of a second computing device of a second party for:

receiving, at the second computing device, an out-of-band user interaction protocol;

receiving, from a first computing device on behalf of a first party at the second computing device of the second party, first information associated with a secure transaction between the first party and the second party;

receiving, from the first computing device at the second computing device, first video or audio evidence of one or more actions taken by the first party;

capturing, by the second computing device during presentation of the first video or audio evidence by the second computing device, acknowledgement of the one or more actions taken by the first party as observed or heard by the second party in the first video or audio evidence;

determining, by the second computing device dependent on the captured acknowledgement, whether or not the one or more actions observed or heard by the second party match actions expected to have been taken by the first party in accordance with the out-of-band user interaction protocol;

allowing the secure transaction between the first party and the second party to proceed in response to determining that the one or more actions observed or heard by the second party match the actions expected to have been taken by the first party in accordance with the out-of-band user interaction protocol; and refraining from performing the secure transaction in response to determining that the one or more actions observed or heard by the second party do not match the actions expected to have been taken by the first party in accordance with the out-of-band user interaction protocol.

11. The non-transitory computer readable memory media of claim 10, wherein:

the first information is a public key of a public-private key pair created on behalf of the first party for potential use when exchanging information between the first party and the second party; and the instructions are further executable by the processor for:

accepting, by the second computing device in response to determining that the one or more actions observed or heard by the second party match the actions expected to have been taken by the first party in accordance with the out-of-band user interaction protocol, the public key;

receiving, from the first computing device, second information associated with the secure transaction; and using, by the second computing device, the public key to decrypt the second information.

12. The non-transitory computer readable memory media of claim 10, wherein:

the first information comprises an identifier of the first party; and the instructions are further executable by the processor for:

authenticating, by the second computing device in response to determining that the one or more actions observed or heard by the second party match the actions expected to have been taken by the first party in accordance with the out-of-band user interaction protocol, the identifier of the first party; and subsequent to authenticating the identifier of the first party, allowing the secure transaction between the first party and the second party to proceed.

13. The non-transitory computer readable memory media of claim 10, wherein:

the secure transaction comprises a transfer of funds from the second party to the first party; and the first information comprises payment instructions received from the first computing device on behalf of the first party.

14. The non-transitory computer readable memory media of claim 10, wherein the first video or audio evidence includes: a sequence of tokens generated by the first computing device in accordance with the out-of-band user interaction protocol recorded by a video camera or voice recorder of the first computing device;

capturing acknowledgement of the one or more actions taken by the first party comprises:

receiving, through a user interface of the second computing device, input identifying the sequence of tokens communicated by the first party as observed or heard by the second party in the first video or audio evidence.

15. The non-transitory computer readable memory media of claim 10, wherein the instructions are further executable by the processor for, in response to determining that the one or more actions observed or heard by the second party match the actions expected to have been taken by the first party in accordance with the out-of-band user interaction protocol:

recording, by the second computing device, second video or audio evidence of one or more actions taken by the second party in accordance with the out-of-band user interaction protocol;

providing, to the first computing device, the second video or audio evidence of the one or more actions taken by the second party; and receiving, from the first computing device, an indication of whether or not actions observed or heard by the first party in the second video or audio evidence match actions expected to have been taken by the second party in accordance with the out-of-band user interaction protocol.

16. The non-transitory computer readable memory media of claim 10, wherein the first video or audio evidence received from the first device comprises a video stream transmitted to the second device during performance of the one or more actions by the first party, a video memo recorded during performance of the one or more actions by the first party, an audio stream transmitted to the second device during performance of the one or more actions by the first party, or an audio memo recorded during performance of the one or more actions by the first party.

* * * * *